United States Patent
Froelich et al.

(10) Patent No.: US 11,927,627 B2
(45) Date of Patent: Mar. 12, 2024

(54) SYSTEMS, METHODS, AND DEVICES FOR HIGH-SPEED INPUT/OUTPUT MARGIN TESTING

(71) Applicant: Tektronix, Inc., Beaverton, OR (US)

(72) Inventors: Daniel S. Froelich, Portland, OR (US); Sam J. Strickling, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/534,404

(22) Filed: Nov. 23, 2021

(65) Prior Publication Data

US 2022/0163587 A1 May 26, 2022

Related U.S. Application Data

(60) Provisional application No. 63/117,971, filed on Nov. 24, 2020.

(51) Int. Cl.
*G06F 30/367* (2020.01)
*G01R 31/30* (2006.01)
(Continued)

(52) U.S. Cl.
CPC ....... *G01R 31/31707* (2013.01); *G01R 31/30* (2013.01); *G01R 31/31813* (2013.01); *G01R 31/318314* (2013.01); *G01R 31/318385* (2013.01); *G01R 31/318572* (2013.01); *G06F 30/367* (2020.01); *G06F 2115/12* (2020.01);
(Continued)

(58) Field of Classification Search
USPC .......................................... 716/136; 714/718
See application file for complete search history.

(56) References Cited

U.S. PATENT DOCUMENTS

| 5,243,273 A | 9/1993 | MacAuliffe |
|---|---|---|
| 6,351,827 B1 | 2/2002 | Co et al. |

(Continued)

FOREIGN PATENT DOCUMENTS

| JP | 2012118002 A | * | 6/2012 |
|---|---|---|---|
| KR | 20180006480 | * | 1/2018 |

(Continued)

OTHER PUBLICATIONS

European Patent Office, International Search Report and Written Opinion for International Application No. PCT/US2021/060663, dated Mar. 14, 2022, 16 pages, Rijswijk, Netherlands.
(Continued)

*Primary Examiner* — Brian Ngo
(74) *Attorney, Agent, or Firm* — Seed Intellectual Property Law Group LLP; Andrew J. Harrington; Michael A. Nelson

(57) ABSTRACT

A system for data creation, storage, analysis, and training while margin testing includes a margin test generator coupled through an interface to a Device Under Test (DUT). The margin test generator is structured to modify test signals for testing the DUT during one or more testing states of a test session to create testing results. The testing results are stored in a data repository along with a DUT identifier of the DUT tested during the test session. A comparator determine whether any results of the DUT test results match a predictive outcome that is based from an analysis of previous DUT tests. If so, a message generator produces an indication that the tested DUT matched the predictive outcome.

18 Claims, 14 Drawing Sheets

(51) Int. Cl.
*G01R 31/317* (2006.01)
*G01R 31/3181* (2006.01)
*G01R 31/3183* (2006.01)
*G01R 31/3185* (2006.01)
*G06F 115/12* (2020.01)
*G06F 119/06* (2020.01)
*G06F 119/12* (2020.01)

(52) U.S. Cl.
CPC ...... *G06F 2119/06* (2020.01); *G06F 2119/12* (2020.01)

(56) References Cited

U.S. PATENT DOCUMENTS

| | | |
|---|---|---|
| 6,449,742 B1 | 9/2002 | Arabi |
| 6,765,877 B1 | 7/2004 | Foschiano |
| 7,099,438 B2 | 8/2006 | Rancu |
| 7,139,949 B1 | 11/2006 | Jennion |
| 7,398,514 B2 | 7/2008 | Ulrich |
| 7,941,718 B2 | 5/2011 | Zhang |
| 9,042,427 B2 | 5/2015 | Singh |
| 10,255,151 B1 | 4/2019 | Levin |
| 2004/0078740 A1* | 4/2004 | Cook, III ......... G11C 29/56004 714/718 |
| 2004/0133834 A1 | 7/2004 | Kanemitsu |
| 2004/0176924 A1 | 9/2004 | Salmon |
| 2006/0184332 A1 | 8/2006 | Ishida |
| 2008/0192814 A1 | 8/2008 | Hafed |
| 2009/0010171 A1 | 1/2009 | Gupta |
| 2009/0261807 A1 | 10/2009 | Sawara |
| 2010/0153052 A1 | 6/2010 | Schmitz |
| 2010/0313089 A1 | 12/2010 | Rajski |
| 2011/0187400 A1 | 8/2011 | Watanabe |
| 2011/0257953 A1 | 10/2011 | Li |
| 2012/0245879 A1* | 9/2012 | Mikkola ........... G01R 31/2884 702/117 |
| 2013/0033285 A1* | 2/2013 | McMahon ......... G01R 31/2642 324/762.09 |
| 2013/0145212 A1 | 6/2013 | Hsu et al. |
| 2014/0112339 A1 | 4/2014 | Safranek |
| 2014/0229666 A1 | 8/2014 | Schoenborn et al. |
| 2015/0067207 A1 | 3/2015 | Iyer |
| 2016/0087822 A1 | 3/2016 | Kossel |
| 2016/0266204 A1 | 9/2016 | Chandra |
| 2017/0019247 A1 | 1/2017 | Tyer |
| 2018/0045781 A1* | 2/2018 | Song .................. G01R 31/2889 |
| 2018/0091358 A1 | 3/2018 | Sasaki |
| 2018/0285225 A1 | 4/2018 | Kumar et al. |
| 2019/0067056 A1* | 2/2019 | Shen ....................... G01R 3/00 |
| 2020/0025824 A1 | 1/2020 | Zhao |
| 2020/0249275 A1 | 8/2020 | Froelich |
| 2020/0250368 A1 | 8/2020 | Froelich et al. |
| 2021/0405108 A1 | 12/2021 | Strickling |
| 2021/0406144 A1 | 12/2021 | Strickling |
| 2022/0091185 A1 | 3/2022 | Strickling |
| 2022/0317181 A1 | 10/2022 | Sakare |

FOREIGN PATENT DOCUMENTS

| | | |
|---|---|---|
| TW | I342403 | 5/2011 |
| TW | I440858 | 6/2014 |

OTHER PUBLICATIONS

Timothy Lyons et al., "The Implementation and application of a protocol aware architecture" 2013 IEEE International Test Conference (ITC), Sep. 6, 2013, pp. 1-10, IEEE, Anaheim, California.

Salem Abdennadher et al., Practices in High-Speed IO Testing, 2016 21th IEEE European Test Symposium (ETS), May 23, 2016, p. 1-8, IEEE, Amsterdam, Netherlands.

* cited by examiner

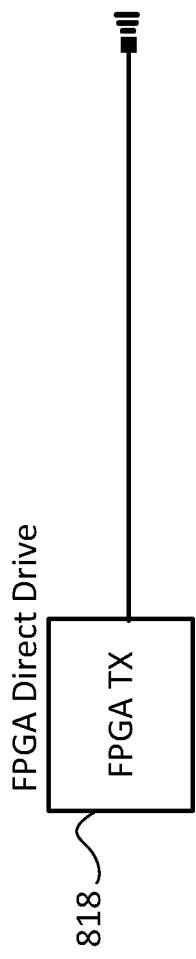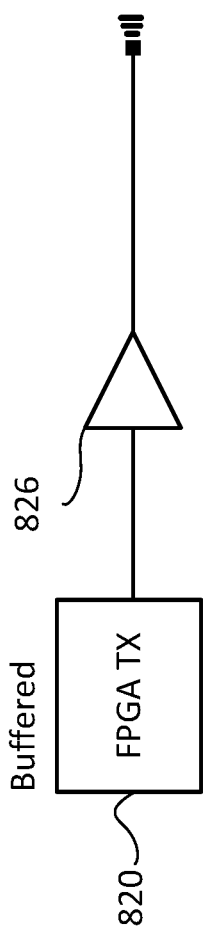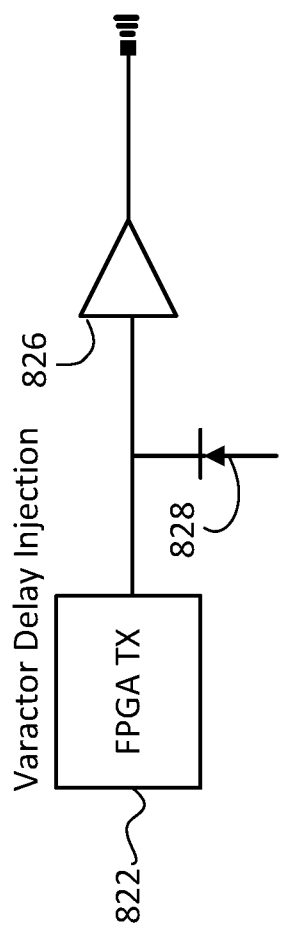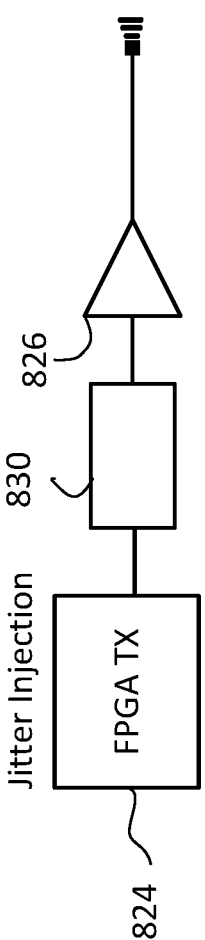

|        | Lane 0 | Lane 1 | Lane 2 | Lane 3 | Lane 4 | Lane 5 | Lane 6 | Lane 7 |
|--------|--------|--------|--------|--------|--------|--------|--------|--------|
| DUT #1 | 15     | 15     | 5      | 15     | 6      | 15     | 15     | 15     |
| DUT #2 | 15     | 15     | 5      | 15     | 15     | 15     | 15     | 15     |
| DUT #3 | 3      | 15     | 5      | 15     | 15     | 15     | 15     | 15     |
| DUT #4 | 15     | 15     | 5      | 15     | 15     | 15     | 8      | 15     |
| DUT #5 | 15     | 15     | 5      | 15     | 15     | 15     | 15     | 15     |

902

Potential Design Issue

Potential Assembly/Production Issue

Fig. 9

SYSTEMS, METHODS, AND DEVICES FOR HIGH-SPEED INPUT/OUTPUT MARGIN TESTING

CROSS-REFERENCE TO RELATED APPLICATIONS

This disclosure is a non-provisional of and claims benefit from U.S. Provisional Patent Application 63/117,971, entitled SYSTEMS, METHODS, AND DEVICES FOR HIGH-SPEED INPUT/OUTPUT MARGIN TESTING, filed Nov. 24, 2020, which is incorporated by reference herein. This disclosure is also related to U.S. Ser. No. 16/778,249, assigned to the assignee of the present disclosure, which is incorporated herein by reference.

TECHNICAL FIELD

This disclosure relates to test and measurement systems, and more particularly to systems and methods for using electrical margin tests on an electrical device-under-test (DUT) to develop device characterizations.

BACKGROUND

Many communication standards outline a series of stressed test scenarios to determine if a device under test (DUT) passes all performance tests with a specified margin for conformance. Test and measurement instruments having a signal source, such as, for example, arbitrary waveform or function generators and bit error rate testers (BERTs), may be used to generate waveforms for stress testing to measure a performance margin of a DUT in response to the received signals. Such testing may be performed during an engineering characterization stage of designing a new device to compare actual electrical performance of the device to simulated performance to ensure that the device is performing as designed. Such testing may also be performed in a production manufacturing environment after an engineering design is finalized to find any manufacturing defects in each device produced.

Many electrical devices include high-speed I/O signal paths or busses. For example, modern personal computer (PC) motherboards as well as other types of electrical devices often include high-speed serial PCI Express (also abbreviated as PCIe, or PCI-e) busses, which are busses that are compliant with and perform according to the PCI Express high-speed serial computer expansion bus standard. Format specifications for the PCI Express standard are maintained and developed by the PCI Special Interest Group (PCI-SIG). These busses are typically used for communication between the motherboard and add-in/daughter cards that plug into PCIe connector slots or ports on the motherboard. Many other electrical devices besides motherboards also employ PCIe busses and connectors for high-speed I/O. PCIe Generation 4 (Gen 4 or version 4) devices can achieve bandwidths up to 16 gigatransfers per second (GT/s). PCIe Generation 5 (Gen 5 or version 5) devices can achieve bandwidths up to 32 GT/s.

PCIe devices communicate via a logical connection called an interconnect or link. A link is a point-to-point communication channel between two PCIe ports allowing simultaneous bi-directional traffic. At the physical level, a link is composed of one or more lanes. Low-speed PCIe devices use a single-lane (×1) link, while a high-speed PCIe device, such as a graphics adapter, typically uses a much wider and faster 16-lane (×16) link. A lane is composed of two differential signaling pairs, with one pair for receiving data and the other for transmitting. Thus, each lane is composed of four wires or signal traces. Conventionally, performance of the lanes of a PCIe device is tested using a Bit Error Rate Tester (BERT) and/or a high-speed signal generator and oscilloscope (scope).

At an engineering bench test and/or engineering characterization stage of development of a printed circuit board (PCB), board design high speed routes (e.g. PCIe interconnects) are simulated, or design "recipes" or reference designs are followed. Pre-production board samples are then often built and tested. However, testing each board sample and each lane for all high speed I/Os with Bit Error Rate Test instruments (BERTs) and scopes is typically not feasible due to cost, time, and complexity constraints. In particular, traditional BERTs and scopes for testing high speed I/O standards such as PCIe continue to increase in cost and complexity as data rates increase. A single Transmitter (Tx) and Receiver (Rx) test station for testing a single PCIe lane at a time can cost over one million dollars. The instruments are also difficult to use for traditional Tx and Rx tests and calibrations and expert (often PhD level) users and significant amounts of time are required to ensure measurements are taken correctly and instruments remain in good working order. Further, typical BERTs are capable of testing only one lane at a time, so the testing occurs in an environment different from the real-world operation of these I/O links, which usually form multi-lane links and can suffer significant cross-talk and loading issues during real operation. Thus, using a BERT to test all lanes of a multi-lane device is expensive, time consuming, and does not necessarily test real-world scenarios. As a result of these constraints, traditional BERTs and scopes are used infrequently in volume electrical testing of pre-production silicon, boards, PCBs and cables, and are usually not used at all in production testing.

Conventional compliance testing is further deficient in that the results of a device test are generally provided as pass/fail or "compliance" results. In other words, a device that barely passes a series of tests as well as a device that easily passes the series of tests are both deemed to pass, even though one device may be a significantly better device.

Embodiments of the disclosure address these and other problems of present-day margin testing devices.

BRIEF DESCRIPTION OF THE DRAWINGS

FIGS. 8A, 8B, 8C, and 8D are block diagrams illustrating example output drive options of an FPGA that may be used in a controller of a margin tester for testing the electrical margin of a multi-lane high speed I/O link of a DUT in the Tx direction, according to an example embodiment.

FIG. 9 is a chart showing results of an example margin test of a device under test (DUT) performed by a high-speed I/O margin tester and identification of potential DUT assembly or production issues based on the results of the margin test, according to an example embodiment.

DETAILED DESCRIPTION

Figure 1:
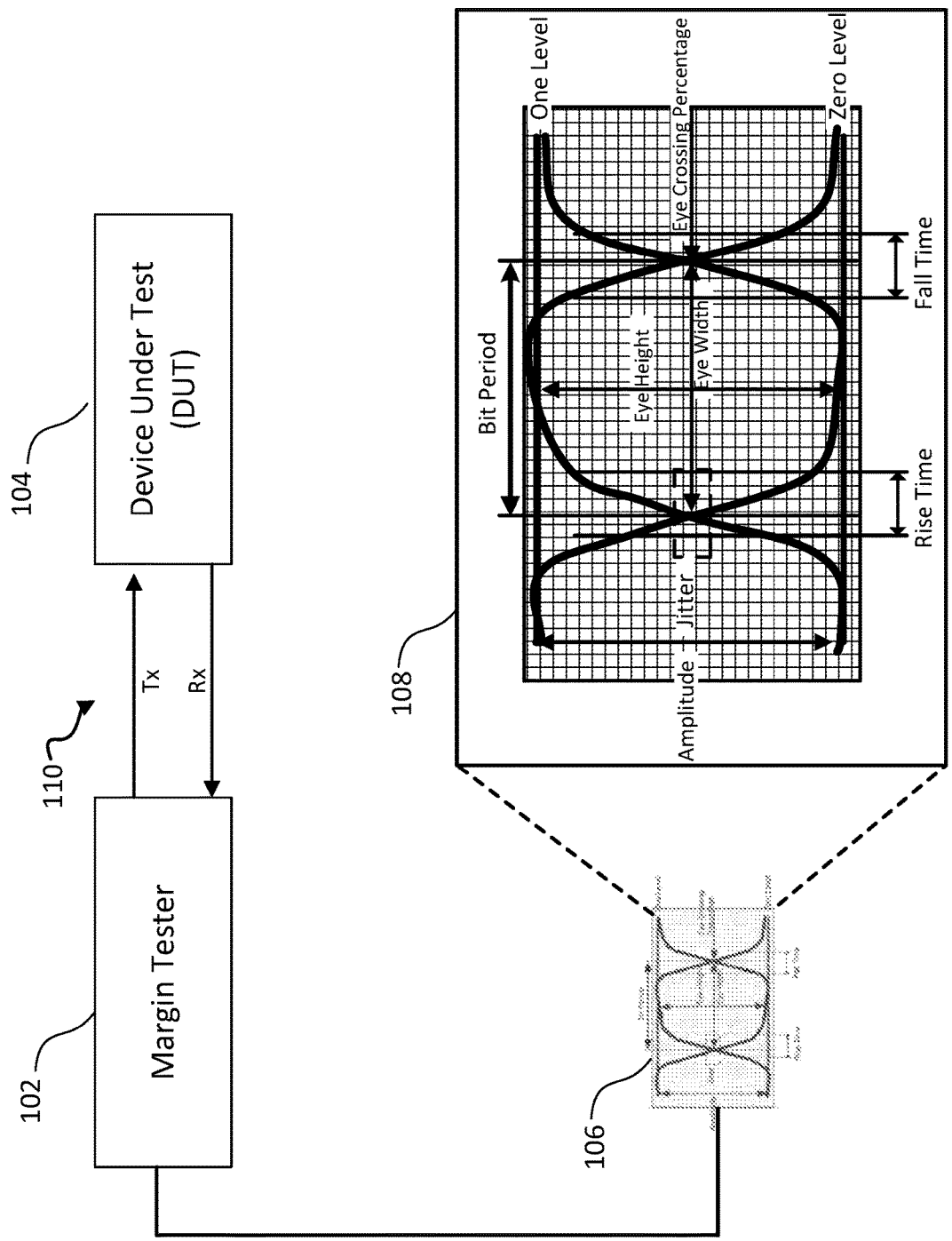
FIG. 1 is an overview block diagram illustrating an example environment in which embodiments of systems, devices and methods for high-speed input/output (I/O) margin testing may be implemented, according to an example embodiment.

FIG. 1 is an overview block diagram illustrating an example environment in which embodiments of systems, devices and methods for high-speed I/O margin testing may be implemented. A margin tester 102 is coupled to a Device Under Test (DUT) 104 through a multi-lane high speed I/O link 110. The I/O link 110 includes both Tx and Rx directions.

The margin tester 102 may be coupled to a test station, PC, terminal, oscilloscope, or other display device 106 that may process, replicate and/or present an eye pattern display or data eye diagram 108 representing various aspects of the multi-lane high speed I/O link 110. In some embodiments, the display device 106 is integrated with the margin tester 102. The display device 106 may include one or more user interfaces by which a user may interact with the margin tester 102. For instance the user may use the user interface to control or otherwise enter specifications about a particular test to be run on the DUT. The margin tester 102 may also convey test results or other information to the user through one or more user interfaces of the display 106. The eye pattern display or data eye diagram 108 is a representation of a high speed digital signal that allows key parameters of the electrical quality of a signal to be quickly visualized and determined, and thus data therefrom may be used to determine statistically valid operating margins of a DUT. The eye pattern display or data eye diagram 108 is constructed from a digital waveform by folding the parts of the waveform corresponding to each individual bit into a single graph with signal amplitude on the vertical axis and time on horizontal axis. By repeating this construction over many samples of the waveform, the resultant graph will represent the average statistics of the signal and will resemble an eye. The eye opening corresponds to one bit period and is typically called the Unit Interval (UI) width of the eye pattern display or data eye diagram 108. The bit period is a measure of the horizontal opening of an eye diagram at the crossing points of the eye and is usually measured in picoseconds for a high speed digital signal (i.e., 200 ps is used for a 5 Gbps signal). The data rate is the inverse of bit period (1/bit period). The bit period is commonly called the Unit Interval (UI) when describing an eye diagram. The advantage of using UI instead of actual time on the horizontal axis is that it is normalized and eye diagrams with different data rates can be easily compared. Eye width is a measure of the horizontal opening of an eye diagram. It is calculated by measuring the difference between the statistical mean of the crossing points of the eye. Rise time is a measure of the mean transition time of the data on the upward slope of an eye diagram. The measurement is typically made at the 20 and 80 percent or 10 and 90% levels of the slope. Fall time is a measure of the mean transition time of the data on the downward slope of an eye diagram. The measurement is typically made at the 20 and 80 percent or 10 and 90 percent levels of the slope. Jitter is the time deviation from the ideal timing of a data-bit event and an important characteristic of a high speed digital data signal. To compute jitter, the time deviations of the transitions of the rising and falling edges of an eye diagram at the crossing point are measured. Fluctuations can be random and/or deterministic. The time histogram of the deviations may be analyzed to determine the amount of jitter. The peak-to-peak (p-p) jitter is defined as the full width of the histogram, meaning all data points present. Root mean square (RMS) jitter is defined as the standard deviation of the histogram. The units for a jitter measurement on a high speed digital signal are normally in picoseconds.

Embodiments of the margin tester 102 can take at least two forms: technology-specific and general purpose. The margin tester 102 can be used with any high speed I/O protocol link of any link width (number of lanes) and use any form of high speed differential signaling including, but not limited to, non-return to zero (NRZ), pulse amplitude modulation-3 (PAM-3), and pulse amplitude modulation-4 (PAM-4). For the sake of a specific example embodiment for testing, PCI Express will be used. However, different high-speed serial bus standards, hardware and protocols may be used.

Figure 2:
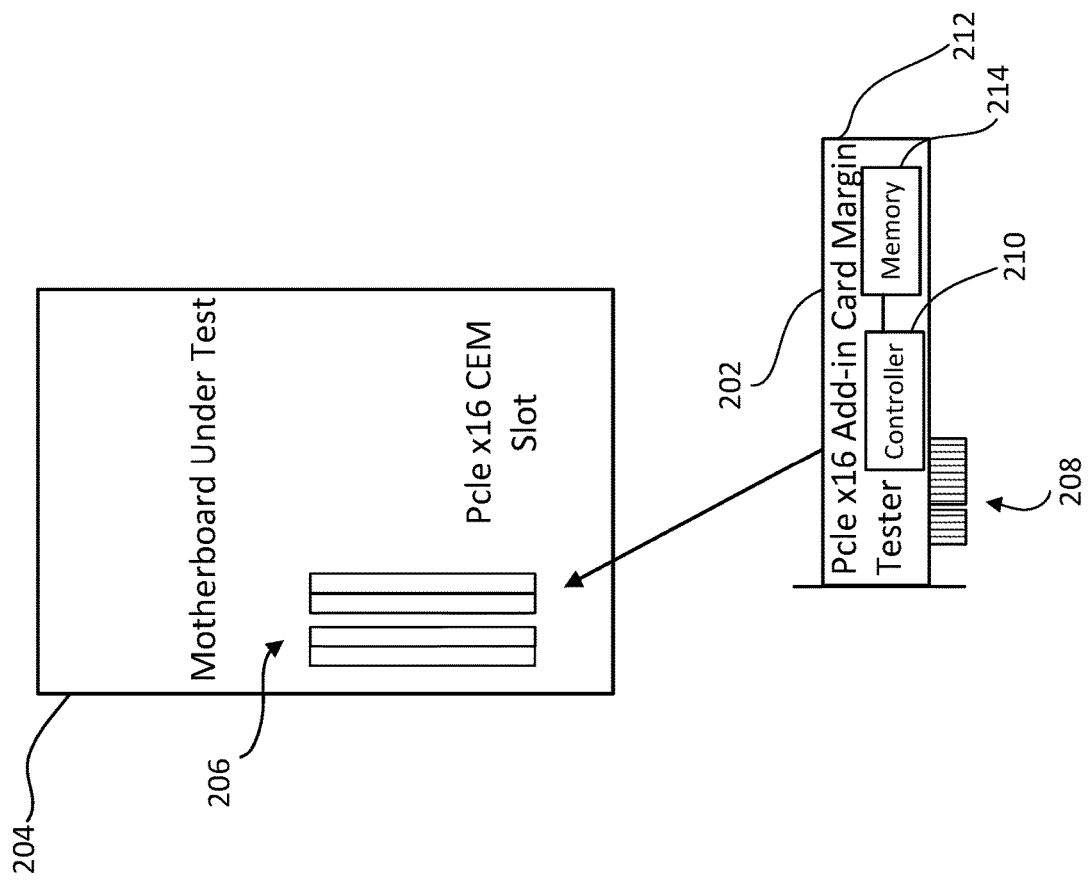
FIG. 2 is a block diagram illustrating an example technology-specific add-in card margin tester compliant with the Peripheral Component Interconnect (PCI) Express high-speed serial computer expansion bus standard to margin test PCI Express motherboard slots, according to an example embodiment.

FIG. 2 is a block diagram illustrating an example technology-specific add-in card margin tester 202 compliant with the PCI Express high-speed serial computer expansion bus standard to margin test PCI Express motherboard slots 206, according to an example embodiment. In a technology-specific form, an embodiment of the margin tester can be implemented as, for example, a PCI Express add-in card margin tester 202 to test PCI Express motherboard slots 206 of a mother board under test 204. For example, the PCI Express add-in card margin tester 202 may be a PCI Express ×16 card electromechanical specification (CEM) form factor add-in card.

The PCI Express add-in card margin tester 202 may be in the form factor of a standard PCI Express compliant add-in card for a specific PCI Express form factor (for example, CEM or M.2 (formerly known as the Next Generation Form Factor (NGFF) or U.2 (formerly known as SFF-8639), etc.). The PCI Express add-in card margin tester 202 may include one or more printed circuit boards (PCBs), such as PCB 212 and one or more components that implement compliant PCI Express physical and logical link layers for each lane. The PCI Express add-in card margin tester 202 may have a number of interfaces, such as connectors 208, coupled to the PCB 212 and a controller 210. The controller 210 is not limited to a single controller but may include one or more controllers working in conjunction. The connectors 208 connect the motherboard slots 206 and margin tester transmitters, which, under control of the controller 210, optionally include the ability to inject controlled noise onto the link to test the motherboard 204. The injected noise may include, for example, voltage swing and sinusoidal jitter. Then after such noise is injected, an eye margin expected at the receiver of the motherboard under test 204 can be varied to specific targets for timing or voltage margin without the need for software running on the motherboard under test 204. The controller 210 may also be coupled to memory a 214, which may store instructions and other data the controller 210 may read, use and/or execute to perform the functions described herein.

Various embodiments of the margin tester may be with or without the noise injection. For cost-conscious production tests, the embodiment without noise injection may be more appealing. The margin tester receivers in the compliant physical layer implementation may include the ability to margin the link as defined in the PCI Express 4.0/5.0 lane margining specifications, but may also include additional and more sophisticated on-die margining capabilities. In one embodiment, the margin tester receivers may measure eye margin by moving the independent error detector and comparing for mismatches with the data sampler. In one implementation, the controller 210, which causes the margin tester 102 to perform the functions described herein, may be implemented with a field programmable gate array (FPGA) and the FPGA I/Os, which is shown in further detail in FIGS. 5, 6, and 7. Other combinations of configurable controller hardware, firmware and/or software may also or alternatively be used.

Figure 3:
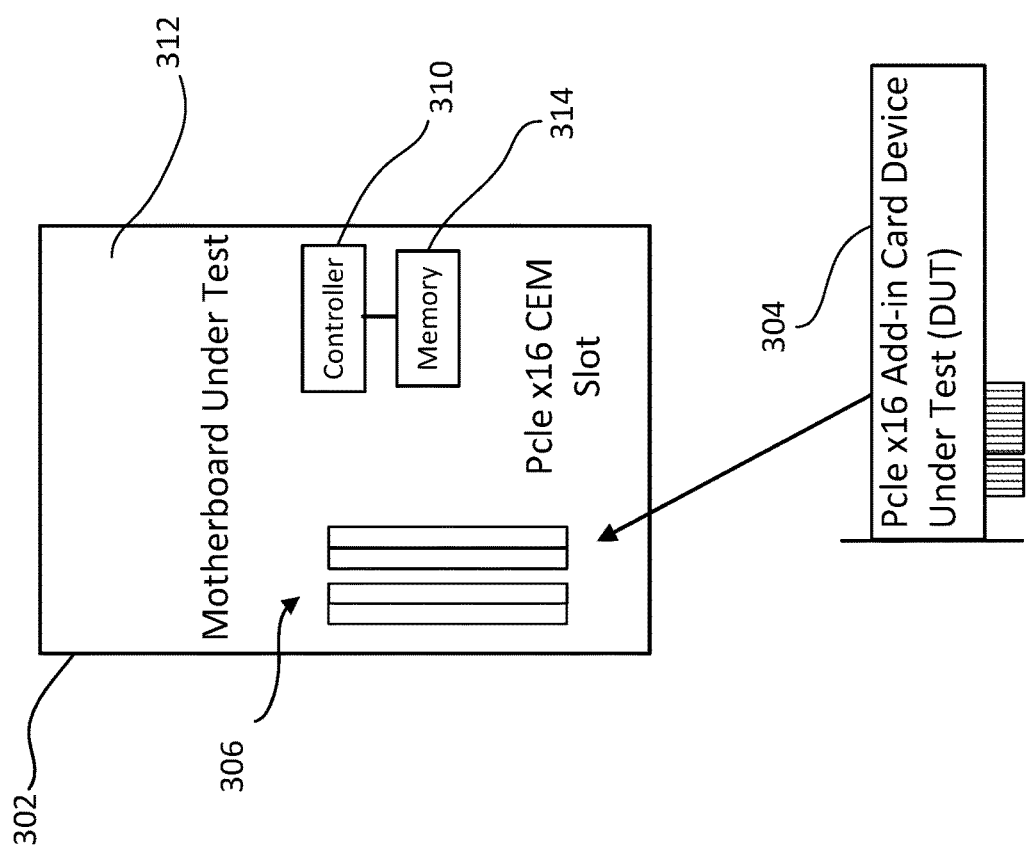
FIG. 3 is a block diagram illustrating a motherboard with slots compliant with the PCI Express high-speed serial computer expansion bus standard to margin test PCI Express add-in cards, according to an example embodiment.

FIG. 3 is a block diagram illustrating an example technology-specific motherboard margin tester 302 with slots compliant with the PCI Express high-speed serial computer expansion bus standard to margin test PCI Express add-in cards, according to an example embodiment. The motherboard margin tester 302 is another example of a technology-specific embodiment of the margin tester 102 disclosed herein, implemented as a motherboard margin tester 302 with one or more PCI Express slots 306 to test PCI Express add-in cards, such as the PCIe ×16 add-in card DUT 304 shown in FIG. 3. The motherboard margin tester 302 may include several interfaces (e.g., one or more PCI Express slots 306) coupled to the PCB 312 and the controller 310. For example, such interfaces may have include one or more PCI Express slots 306 into which the PCIe ×16 add-in card DUT 304 may be inserted for testing. Differently than the embodiment described in FIG. 2, the motherboard margin tester 302 includes a controller 310 and memory 314 to perform the margin tests described above on a DUT 304, which is formed as a PCIe card. The controller 310 and memory 314 may be embodiments of and perform the same functions as controller 210 and memory 214 described above with reference to FIG. 2. The controller 310 may also be configured to assess the electrical margin of the single-lane or multi-lane high speed I/O link by at least being configured to introduce varying amounts of skew lane-to-lane across multiple lanes.

Figure 4:
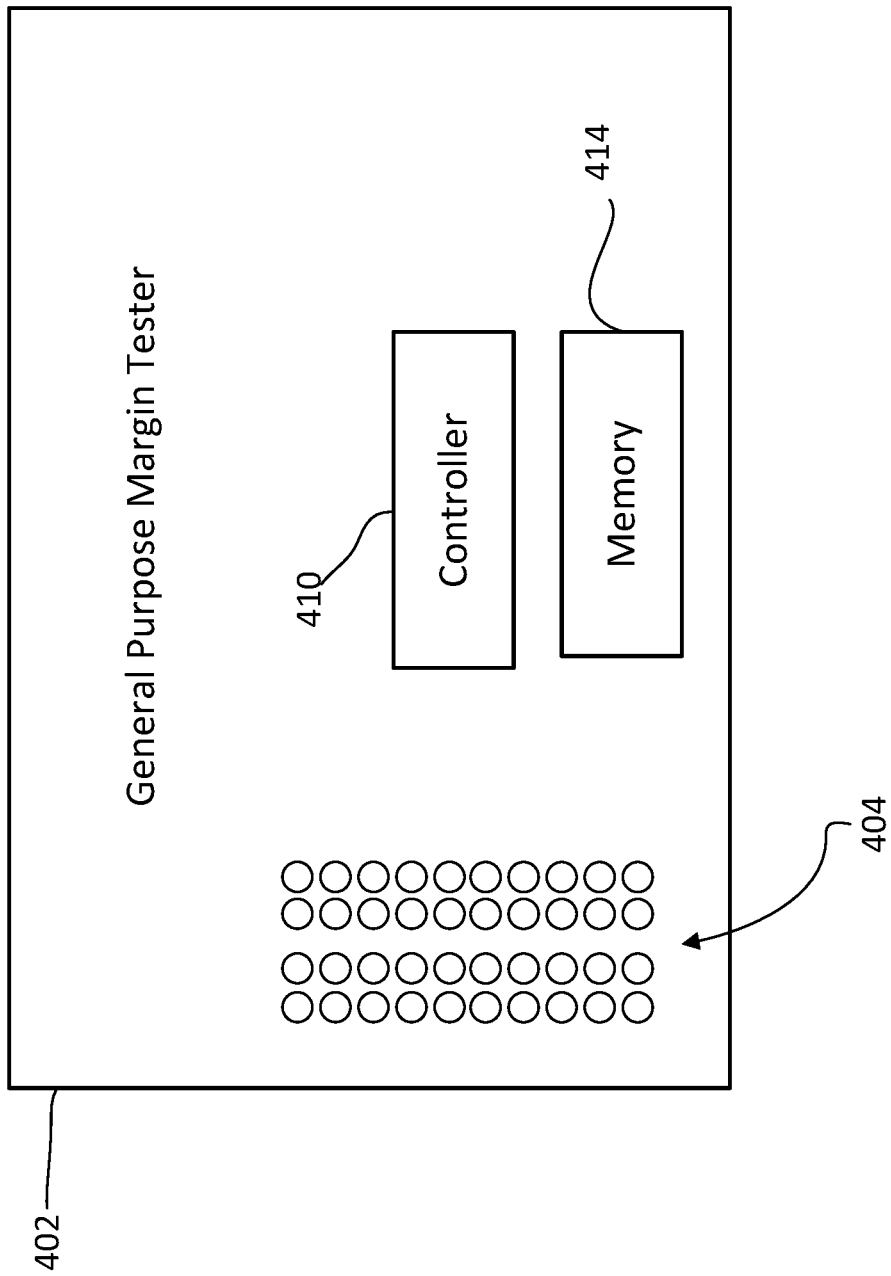
FIG. 4 is a block diagram illustrating a general purpose margin tester with a plurality of interfaces configured to be cabled to at least one test fixture to assess the electrical margin of the multi-lane high speed I/O link of the DUT in both transmit (Tx) and receive (Rx) directions, according to an example embodiment.

FIG. 4 is a block diagram illustrating a general purpose margin tester 402 with a number of individual interfaces 404 configured to be connected, e.g., via one or more cables, to at least one test fixture to assess the electrical margin of the multi-lane high speed I/O link of the DUT in either or both Tx and Rx directions, according to an example embodiment. The general purpose margin tester 402 includes a controller 410 and associated memory 414, which may store instructions and other data the controller 410 may read, use and/or execute to perform the functions described with reference to the controller 210 and memory 214 as described above. The repeated description of those functions and operations is omitted for brevity. The margin tester 402 may also be used to test add-in cards by cabling to test fixtures, including the standard PCI Express Compliance Base Board (CBB) for testing add-in cards. The interfaces 404 of the margin tester 402 may include standard co-axial connectors or other connectors and cables for each high speed differential signal or, in various other embodiments, include custom high density connectors and fixtures to minimize the cable count and make switching from one DUT to another DUT more efficient.

In some examples, the DUT may be an interconnect under test, which are traditionally tested with vector network analyzers (VNAs). However, VNAs are often costly and complex. In addition, the scatter parameters (s-parameters) produced by VNA measurements are generally viewed as increasingly unreliable at high frequencies—especially when used in statistical simulation of high-speed serial links.

Examples of the disclosure, however, can use any of the margin testers 102, 202, 302, or 402 to test a passive or active interconnect, including one or more cables and/or PCB segments, to evaluate an actual margin difference across many lanes and parts quickly. These tests can easily identify worst cases and levels of risk of the interconnects. As such, the margin testers can include a "VNA" mode to test active or passive interconnects.

If a single-port margin tester is used, then the transmitters of the single-port are generally connected to one side of the interconnect under test and the receivers of the single-port are connected to the other side of the interconnect. Then a margin test in non-protocol PRBS can run to test the interconnect under test. Examples of the disclosure however are not limited to a single margin tester to test the interconnect under test. Rather, the test may also be run with the transmitters of one margin tester connected to the interconnect under test and the receivers of another margin tester connected to the other end of the interconnect under test. In this description, the term margin tester 100 may refer to any of the margin testers 102, 202, 302, or 402, or the later-described margin testers 502 or 702, or their equivalents.

Additionally or alternatively, a multi-port margin tester 100 can be used to measure the interconnect under test in an active protocol state after training. In such a set-up, the interconnect under test can be connected to one port of the multi-port margin tester 100 and the other side of the interconnect under test can be connected to another, different port of the multi-port margin tester 100. Then, the interconnect under test can be tested to measure the margin with a protocol in an active protocol state after training. Alternatively, rather than a multi-port tester 100, the multiple margin testers 100 may be used to run the margin test of the interconnect under test.

Figure 5:
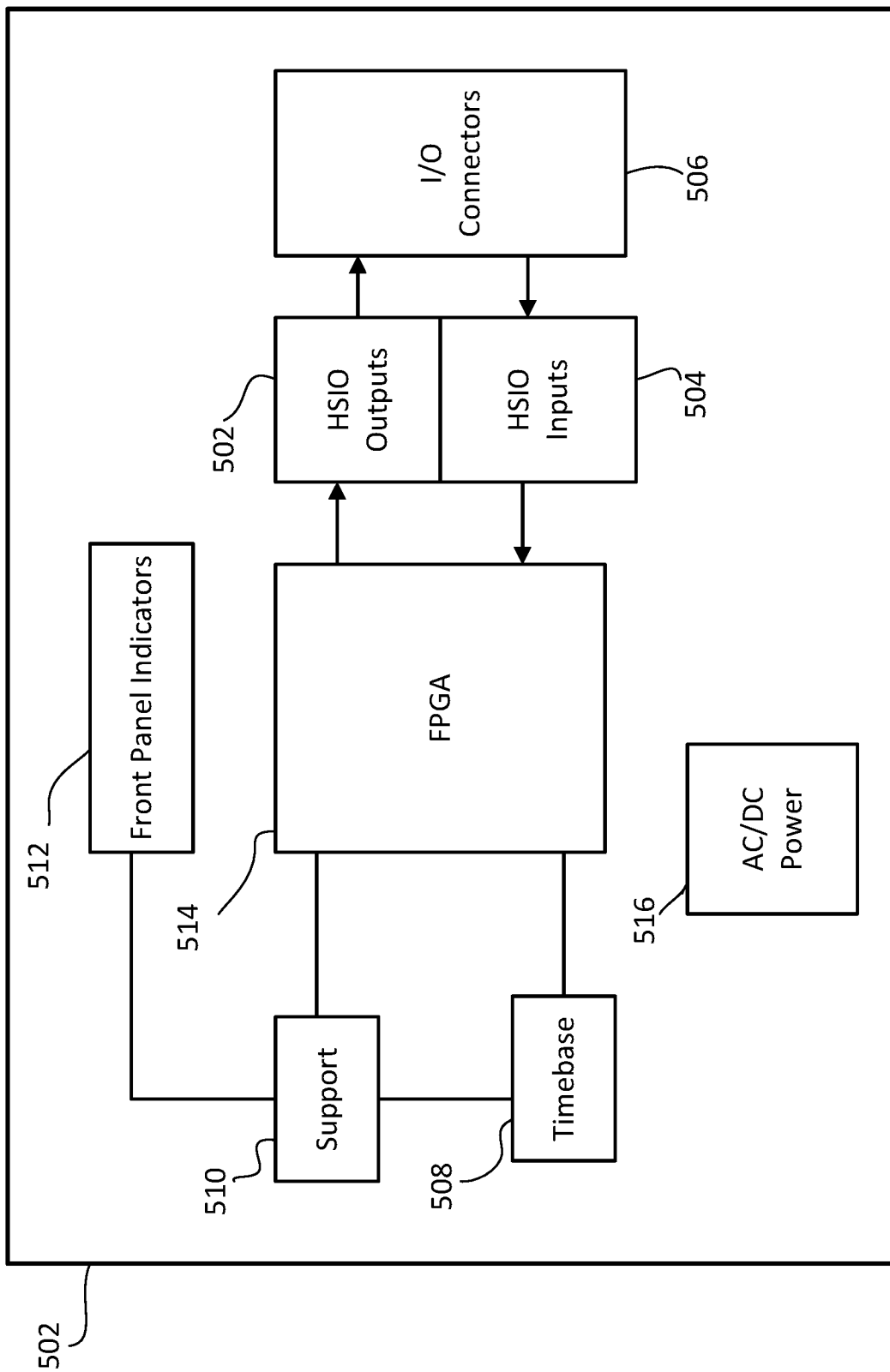
FIG. 5 is a block diagram of an example margin tester for testing the electrical margin of a multi-lane high speed I/O link of a DUT in both Tx and Rx directions, according to an example embodiment.

FIG. 5 is a block diagram of an example margin tester 502 for testing the electrical margin of a multi-lane high speed I/O link of a DUT in either or both Tx and Rx directions, according to an example embodiment. Any of the margin testers 102, 202, 302, and 402 may include the components and/or functions described with reference to the margin tester 502. The margin tester 502 of FIG. 5 includes an FPGA 514 operably coupled to a support unit 510 (which may include Ethernet and other communication functionality), a timebase unit 508 for providing a system reference clock, a high-speed I/O (HSIO) outputs unit 502 and a HSIO inputs unit 504. The margin tester 502 may also be powered by an AC/DC power unit 516. The HSIO outputs unit 502 and HSIO inputs unit 504 are also operably coupled to I/O connectors 506. The FPGA 514 is a semiconductor device that is based around a matrix of configurable logic blocks (CLBs) connected via programmable interconnects. In various embodiments, the margin tester 502 may have fewer or more components than shown and some components or functionality of components shown, although in operable communication with the margin tester 502, may be located outside or separate from the margin tester, or located or integrated in the FPGA 514.

The FPGA 514 can be reprogrammed to desired application or functionality requirements after manufacturing, such as to perform the functionality of the margin tester 502 described herein. For example, firmware on the FPGA 514 may act as a standard PCI Express upstream port, also referred to as an endpoint, (for testing motherboards, as in the embodiment of the add-in card margin tester 202) or standard PCI Express root port, also referred to as an upstream port or root complex, (for testing add-in cards, such as in the embodiment of the motherboard margin tester 302), including some link layer logic for any of the margin testers 100 to infer when errors start at the DUT receiver based on traffic in the opposite direction and to quickly reduce margin stress once errors occur to prevent catastrophic link failure. In some embodiments, the FPGA 514 may be implemented using or may otherwise include a systems-on-modules (SoM) architecture that may incorporate memory, interface, etc. in the FPGA 514. The SoM may be implemented, for example, with an Advanced Reduced Instruction Set (RISC) Machine, originally Acorn RISC Machine (ARM) architecture.

A configuration application and/or script may be implemented via the FPGA 514 or stored on another accessible memory device or other non-transitory computer-readable storage media that enables an end user to easily configure margin tester options of the margin tester 502, including multiple runs with one or more of the following options. In some embodiments, an option for a bit error rate (BER) target may be set for margin scans (milliseconds for E-6 type margins and minutes for E-12 type margins). For example, such targets may include, but are not limited to targets related to: number of times to margin, margin timing and/or voltage; fixing Tx equalization for the margin tester or DUT transmitters; and fixing Rx CTLE and DFE for margin tester receivers. In some embodiments, an optional application and/or script is provided that removes data from the margin tester 502 and provides visualization tools for users to view large sets of margin data across multiple products/samples and view averages, run-to-run variations and trends over time and compare margins across multiple runs on the same DUT with different configuration options (fixed Tx equalization, etc.). In some embodiments, an optional application, which may be implemented on a bootable drive to install on the motherboard under test, is provided that unlocks additional options for motherboard testing including, but not limited to: running in loopback instead of LO and using specific patterns; using on the on-die margining features in the DUT silicon instead of the voltage swing and Sj margining from the DUT transmitters, and running both ways and comparing results.

In some embodiments, an optional plug-in model is provided that would allow the margin tester configuration application to also configure RX equalization settings on the DUT silicon if a plug-in is provided for that particular DUT silicon. In some embodiments, an optional IBIS-AMI (or similar) software model is provided for each individual margin test unit that may be used by designers and system integrators to include in their simulations to help establish test limits/methodology for specific customer setups. IBIS-AMI is a modeling standard for Serializer/Deserializer (SerDes) physical layers (PHYs) that enables fast, accurate, statistically significant simulation of multi-gigabit serial links. In some embodiments, an optional IBIS-AMI model is provided for the margin test unit, along with customer models (IBIS-AMI or scattering (S) parameters) and can also be utilized by follow-on efforts to include some level of system de-embed for increased accuracy and repeatability. A general model for a margin tester 502 can be provided as the model or a specifically tuned model for a particular margin tester 502 with tuning performed as part of manufacturing test and characterization can be generated.

Figure 6:
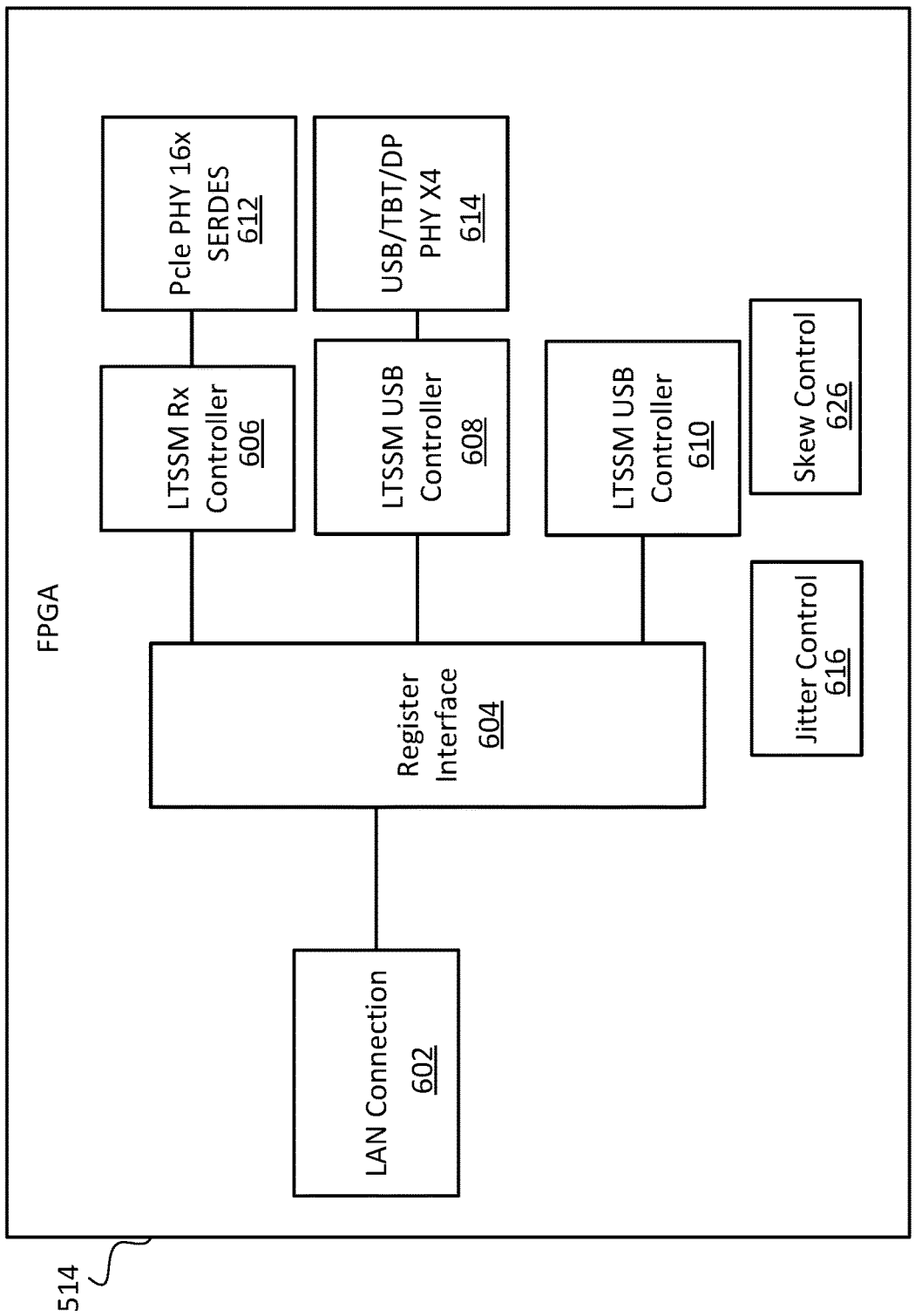
FIG. 6 is a block diagram of an example of a configured field programmable gate array (FPGA) that may be used in a controller of a margin tester for testing the electrical margin of a multi-lane high speed I/O link of a DUT in both Tx and Rx directions, according to an example embodiment.

FIG. 6 is a block diagram of an example of a configured field programmable gate array (FPGA) 514, such as that illustrated in FIG. 5, that may be used in any of the controllers 210, 310, 410 of a margin tester 100 for testing the electrical margin of a multi-lane high speed I/O link of a DUT in either or both Tx and Rx directions, according to an example embodiment. In various embodiments, the FPGA 514 may have more or fewer components than shown and some components shown, and/or functionality of those components, which are in operable communication with the FPGA 514, may be located outside or separate from the FPGA 514. Shown is a register interface 604 operably coupled to a local area network (LAN) connection 602, which may include a SerDes. The register interface 604 is also operably coupled to a Link Training and Status State Machine (LTSSM), Rx controller 606. One of the processes at the physical layer of the operation of the margin tester 100 is the link initialization and training process. In PCI Express devices, this process establishes many important tasks such as link width negotiation, link data rate negotiation, bit lock per lane, symbol lock/block alignment per lane, etc. All these functions are accomplished by the LTSSM devices, which observe the stimulus from remote link partners as well as the current state of the link, and responds accordingly. The register interface 604 is also operably coupled to one or more additional LTSSM controller units, such as a LTSSM Universal Serial Bus (USB) controller 608 and an additional LTSSM USB controller 610. In the example embodiment shown, the LTSSM Rx controller 606 is operably coupled to a PCIe physical layer (PHY) 16× SerDes 612 and the LTSSM USB controller 608 is operably coupled to a USB/Thunderbolt/Displayport (USB/TBT/DP) PHY ×4 unit 614.

A skew control unit 626 can also be a part of, or operably coupled to, the FPGA 514 for controller a programmable skew. Previously, the only test instruments that could generate varying amounts of skew lane-to-lane across multiple lanes were significantly complex and expensive multi-lane BERTs. The multi-lane BERTs, however, are not capable of running a full training protocol like the margin testers disclosed herein, including transmission equalization training for modern protocols like PCIe. As such, previously there was no way to lab test with a protocol and variety of different skews without extremely expensive and complex test set-ups. Examples of the disclosure, however, can add per lane transmission skew in a number of different ways using the skew control unit 626.

For example, the skew control unit 626 may include individual per lane programmable length first in, first out (FIFO) buffers to set the amount of skew per each lane. Additionally or alternatively, the skew control unit 626 may program per lane variable length transmission FIFOs in the FPGA 514 fabric for each lane. Additionally or alternatively, the skew control unit 626 can include a soft controller that can modify the controller logic to have a variable length programmable per lane transmission FIFOs feeding each of the physical layer transmitters.

A jitter control unit 616 is also present as part of, or operably coupled to, the FPGA 514 for controlling a jitter insertion unit such that such that the eye margin expected at the DUT receiver can be varied to specific targets for timing or voltage margin without the need for software running on the DUT.

When the margin tester 100 is testing a specific protocol, such as PCIe, the margin tester is running the full protocol and can track the link state as the link trains to the active state through the LTSSM controller units 606, 608, and 610. The FPGA 514 of the margin tester 502 can perform margin measurements repetitively as the training proceeds and capture a log of the link training state in time versus the electrical margin in one or both directions.

Figure 7:
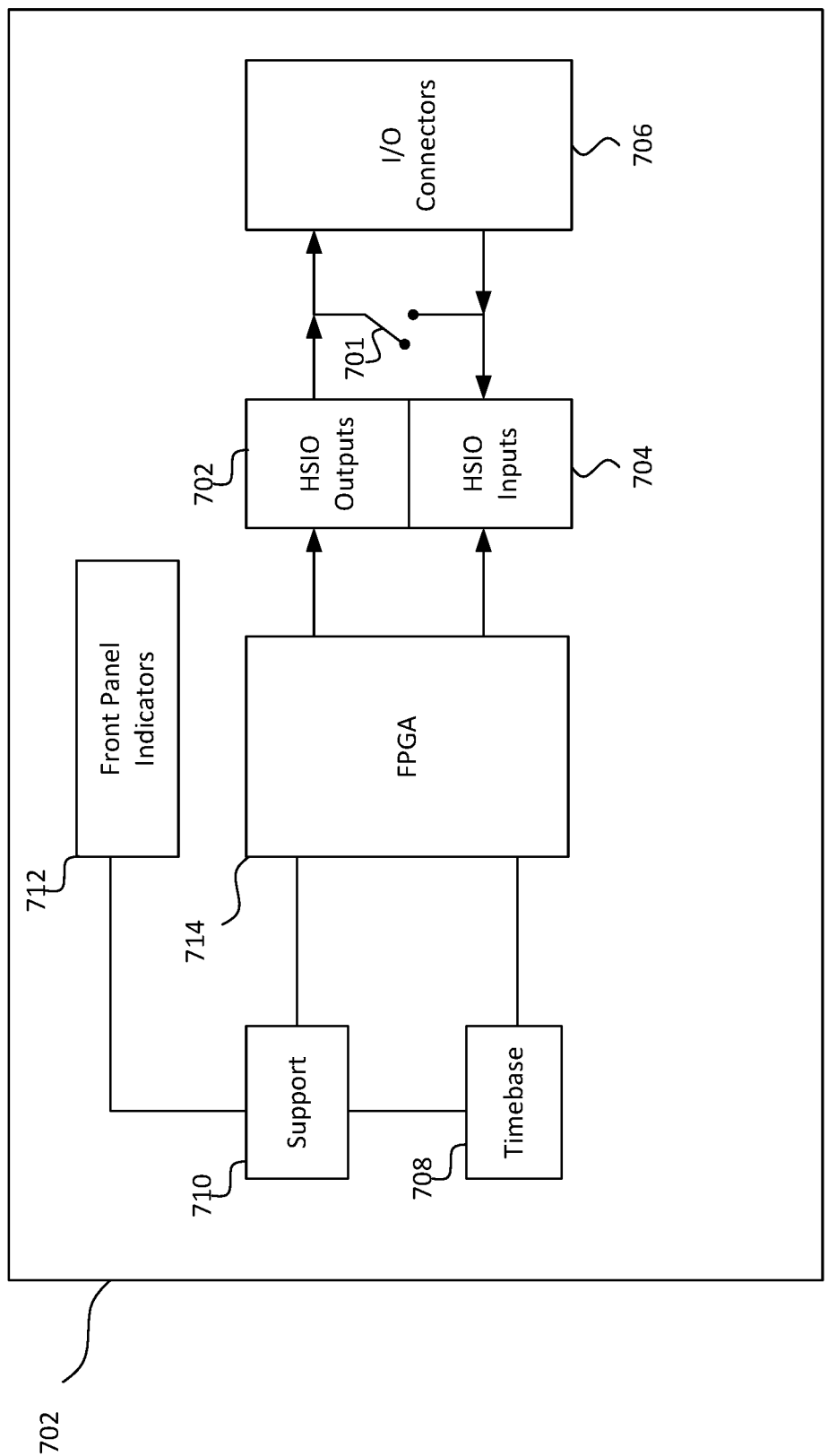
FIG. 7 is a block diagram of another margin tester for testing the electrical margin of a multi-lane high speed I/O link of a DUT in both Tx and Rx directions, according to an example embodiment.

FIG. 7 illustrates an example of a margin tester 702 with self-calibration. Calibration of the margin tester 702 can be performed by electrically connecting the transmitters to the receivers. This can be done, for example, by a switch within the margin tester 702 to electrically connect the transmitters to the receivers in the same margin tester 702. This eliminates a need for external test equipment. This technique may be used in any of the margin testers 100 described above.

FIG. 7 is similar to the embodiment described with reference to FIG. 5. FIG. 7 is a block diagram of an example margin tester 702 for testing the electrical margin of a multi-lane high speed I/O link of a DUT in either or both Tx and Rx directions, as well has having self-calibration. To perform the self-calibration, one or more switches 701 can be provided to connect each of the transmitters in the HSIO outputs unit 702 to each of the receivers in the HSIO inputs unit 704. The transmitters can output a signal and the receivers can receive the signal and determine if the margin tester 702 is within a desired range. A single switch 701 is shown in FIG. 7 for ease of illustration, but as will be understood by one skilled in the art, multiple switches 701 may be provided to connect the transmitters to the receivers. Alternatively to the switch 701, a calibration device or fixture may be provided at the I/O connectors 706 to cause the transmitters to loop back to the receivers to perform self-calibration Different operating modes may be provided for performing calibration of the margin tester 702. For example, self-calibration may be performed only at the factory with a special loopback fixture that can connect the transmitters to the receivers through one or more of the I/O connectors 706. Another operating mode that may be provided is having an end-user perform a self-test of the margin tester 702. This can be performed by activating the switch 701 or inserting a fixture that can route the transmitters to the receivers of the margin tester 702. During the self-test, the margin tester 702 may output to the front panel indicators 712 if the results are outside a specified range.

In some examples, the calibration can be performed in either a protocol mode, a PRBS pattern non-protocol mode, or both. However, in a protocol mode, the I/O connectors 706 may not be able to act as both a host and a test device simultaneously. If the margin tester 702 has two sets of I/O connectors 706, then the margin tester 702 may have to connect the two different sets of I/O connectors 706 or a second margin tester 702 may be connected. The internal calibration can provide faster and potentially less expensive factory calibration for the margin testers 702 than traditional instruments. The internal calibration can also can enable an end user to perform their own calibration testing.

FIGS. 8A, 8B, 8C, and 8D are block diagrams illustrating example output drive options of an FPGA, such as FPGA 514 of the above Figs., that may be used in a controller, such as controller 210, 310, or 410 of a margin tester for testing the electrical margin of a multi-lane high speed I/O link of a DUT in either or both Tx and Rx directions, according to an example embodiment.

FIG. 8A illustrates an FPGA direct drive option 818, which is not buffered and does not include any varactor delay injection or jitter injection. The second output drive option, illustrated in FIG. 8B, is a buffered drive option 820 that includes a linear buffer or limiting amp 826 with differential output voltage (Vod) that does not include any varactor delay injection or jitter injection. The third output drive option, illustrated in FIG. 8C, is a varactor delay injection option 822, which includes a linear buffer 826 and a varactor component 828, which results in intersymbol interference (ISI) plus some delay, which, for example, may be ~3-5 ps. The fourth output drive option, illustrated FIG. 8D, is a jitter injection option 824, which, in one embodiment, may include an optional linear buffer 826, and a jitter injection circuit 830. In one embodiment the jitter injection circuit 830 is an application specific integrated circuit (ASIC) that generates jitter (~100 ps at 32 GBd), which is available from ADSANTEC. In some embodiments, the linear buffer 826 is not included. In other embodiments the jitter injection circuit may be performed by differential noise injection or other known methods.

In various embodiments, different kinds of stresses may be used by the margin tester 100 to identify various different corresponding failure modes including, but not limited to, failure modes related to: assembly; interconnects (surface-mount technology (SMT), packages, connectors, through-holes, vias, etc.); defects; impacts series resistance; failure modes that cause ISI and baseline wander; eye closure impact; failure modes that cause other than width closure; functional test escape; operator configuration error; incoming material; process variation; receiver bandwidth, which is similar to interconnect changes; power supply rejection ratio (PSRR); vertical/horizontal eye closure; PLL stability; design; deltas between lanes. The varactor-based method for jitter insertion may be more effective for exacerbating assembly-related defects.

As described above, the margin tester 100 may be configured or programmed to performing margin testing on a DUT. In some embodiments, after establishing a multi-lane high speed I/O link of the device under test (DUT), the margin tester 100 assesses an electrical margin, in either or both transmit (Tx) and receive (Rx) directions, for each high-speed input/output (I/O) lane of the multi-lane high speed I/O link. For example, the assessing the electrical margin may include injecting adjustable stress on margin test transmitters of the multi-lane high speed I/O link. The adjustable stress may include injection of jitter applied on all lanes of the multi-lane high speed I/O link simultaneously and applying voltage swing. The assessing the electrical margin may also include assessing the electrical margin, in both transmit (Tx) and receive (Rx) directions, simultaneously for each high-speed input/output (I/O) lane of the multi-lane high speed I/O link.

The margin tester 100 may also be used to identify potential DUT assembly or production issues based on margin testing electrical margin of a multi-lane high speed I/O link of a DUT in either or both Tx and Rx directions. In this mode of operation, the margin tester 100 assesses, for each DUT of a plurality of DUTs, timing eye width margin, in either or both Tx and receive Rx directions, for each high-speed input/output (I/O) lane of a multi-lane high speed I/O link of the DUT. In one example, the margin tester 100 identifies a potential DUT design issue based on the detection of the timing eye width margin measurements for each DUT of the plurality of DUTs that are consistently below the minimum predetermined thresholds for the same lane across the plurality of DUTs. The detecting may also or instead include, detecting, based on the assessing, timing eye width margin measurements for multiple DUTs of the plurality of DUTs that are each below a predetermined threshold for different lanes across the multiple DUTs.

In some embodiments the margin tester 100 may be programmed or configured: to choose one or more different high-speed I/O protocols with which to perform margin testing test based on the multi-lane high speed I/O link of the DUT; to test multiple ports of the DUT with mixed protocols simultaneously; to output run-to-run variation in margin over any number of margin test runs of the margin tester on the multi-lane high speed I/O link; to implement fixed Tx Equalization (EQ) on the DUT to test how much of margin variation is due to Tx EQ training variation; to use Fixed CTLE in receivers of the margin tester to test impact of receiver equalization on margin of the multi-lane high speed I/O link of the DUT; to use Decision Feedback Equalization (DFE) in the receivers of the margin tester to test impact of receiver equalization on margin of the multi-lane high speed I/O link of the DUT; to calculate expected margins for the margin tester based on target channels; to automatically produce debug information when low margins are detected as a result of the assessment of the electrical margin of the multi-lane high speed I/O link; to switch to using variable Inter Symbol Interference (ISI) source to find how much ISI causes lanes of the multi-lane high speed I/O link to fail; to test each lane individually to identify an amount of margin loss to due to cross-talk of the multi-lane high speed I/O link of the DUT; turn off DFE in the receivers of the margin tester to assess margin with and without DFE and an amount of non-linear discontinuities in each channel associated with the multi-lane high speed I/O link; to generate characterization data for the margin tester that shows expected margins with reference receivers and typical channels and allows lower than expected margin to be flagged even when the lower than expected margin is consistent across all lanes of the multi-lane high speed I/O link of the DUT and of multiple DUTs; to select from multiple speeds of the multi-lane high speed I/O link on which the assessment of the electrical margin is performed; to infer when errors have happened at the receivers of the DUT based on traffic traveling in an opposite direction on the multi-lane high speed I/O link by the margin tester using protocol specific knowledge to enable the margin tester to perform margin tests on production lines without software on the DUT; to automatically capture Time-Domain Reflectometry readings (TDRs) of low margin channels detected as a result of the assessment of the electrical margin of the multi-lane high speed I/O link; to perform an automated connection to an oscilloscope to automatically capture digitized waveforms when low margins are detected as a result of the assessment of the electrical margin of the multi-lane high speed I/O link; and to configure the one or more of the user-selectable options for the DUT by configuring DUT silicon to implement the one or more of the user-selectable options, for example.

In some embodiments the margin detector 100 may provide options to perform or may perform calibration of the DUT, enabling a user to receive a set of expected margins with a series of reference channels. In these embodiments the calibrated margin tester 100 is configured to measure electrical eye margin in either or both transmit (Tx) and receive (Rx) directions of a device under test (DUT) with a fully running operation link of the DUT without special test modes and to capture full loading and cross-talk effects. An individually calibrated model for the margin tester may also be provided, enabling computation of expected margins with one or more of: individualized system channels, receiver models and transmitter models. Also, a feature in DUT silicon is provided that enables the margin tester to use vendor defined messages or another protocol mechanism to indicate that a margin test is about to take place by the margin tester, causing the DUT silicon to be able to disable logic that would degrade link width or speed of the link due to errors for a duration of the margin test.

A software application of the margin tester is also provided, that enables performance of testing by the margin tester of a channel component under test (e.g., bare printed circuit board (PCB) or a cable) in a testing configuration where a margin tester is used on either or both sides of the channel component under test. In some embodiments, hardware of the margin tester is provided to a company that manufactures a printed circuit board (PCB) and data associated with use of the margin tester is provided to silicon companies which provide silicon used in production of the PCB.

The margin tester 100 may also configure a connected DUT for running margin tests by the margin tester 100 under different conditions for silicon of the DUT. The margin tester 100 may receive a software plug-in that enables configuration and DUT silicon parameters for running the margin tests by the margin tester 100 under the different conditions for the silicon of the DUT. The DUT silicon parameters may include, but are not limited to, one or more of: parameters related to receiver continuous time CTLE and parameters related to DFE.

Benefits, advantages and improvements of the disclosed embodiments include, but are not limited to the following features. Some embodiments can be implemented almost entirely with off-the shelf components including standard FPGAs and sinusoidal jitter injection chips or delay lines and have very low cost compared to traditional BERTs and scopes. An example embodiment can run on full multi-lane links operating in the normal operating state without the need for special software and capturing any effects due to the all lanes operating at once. Another advantage is that embodiments of the present disclosure can test in either or both directions (Tx and Rx) in a single self-contained unit. Various embodiments can also be run in a production environment (for example, in a motherboard production test environment) without the need for any software or modifications on the DUT. Test specific logic, which varies by protocol, may be provided in the margin tester 102 silicon/firmware to recognize very quickly when errors are occurring at the DUT receiver based on the data that is being transmitted back to the margin tester by the device under test. Some example embodiments include features implemented in the DUT silicon to recognize through PCI Express vendor specific messages or other standard protocol features that margin testing is going to take place and place the DUT silicon in a state where it would not degrade the link width and/or speed normally due to errors. This helps to ensure that the margining process to the DUT receivers using noise injection or voltage swing adjustments could occur without risk of degrading the link width or speed through normal protocol mechanisms. This is an alternative to special logic to quickly infer when errors start and reduce stress before link or speed degradation can occur.

Additional features of embodiments of the disclosed technology may include the following functionality that may be performed under control of one the controllers 210, 310, 410 (for example, executing instructions according to a configured FPGA and/or read from another non-transitory computer-readable storage medium): choosing one or more different high-speed I/O protocols with which to perform margin testing test based on the multi-lane high speed I/O link of the DUT; testing multiple ports of the DUT with mixed protocols simultaneously; outputting run-to-run variation in margin over any number of margin test runs of the margin tester on the multi-lane high speed I/O link; implementing fixed Tx Equalization (EQ) on the DUT to test how much of margin variation is due to Tx EQ training variation; using fixed continuous time linear equalization (CTLE) in receivers of the margin tester to test impact of receiver equalization on margin of the multi-lane high speed I/O link of the DUT; using decision feedback equalization (DFE) in the receivers of the margin tester to test impact of receiver equalization on margin of the multi-lane high speed I/O link of the DUT; calculating expected margins for the margin tester based on target channels; automatically producing debug information when low margins are detected as a result of the assessment of the electrical margin of the multi-lane high speed I/O link; switching to using variable Inter Symbol Interference (ISI) source to find how much ISI causes lanes of the multi-lane high speed I/O link to fail; testing each lane individually to identify an amount of margin loss to due to cross-talk of the multi-lane high speed I/O link of the DUT; turning off DFE in the receivers of the margin tester to assess margin with and without DFE and an amount of non-linear discontinuities in each channel associated with the multi-lane high speed I/O link; showing expected margins with reference receivers and typical channels which allows lower than expected margin to be flagged even when the lower than expected margin is consistent across all lanes of the multi-lane high speed I/O link of the DUT and of multiple DUTs; selecting from multiple speeds of the multi-lane high speed I/O link on which the assessment of the electrical margin is performed; inferring when errors have happened at the receivers of the DUT based on traffic traveling in an opposite direction on the multi-lane high speed I/O link by the margin tester using protocol specific knowledge to enable the margin tester to perform margin tests on production lines without software on the DUT; automatically capturing time-domain reflectometry readings (TDRs) of low margin channels detected as a result of the assessment of the electrical margin of the multi-lane high speed I/O link; performing an automated connection to an oscilloscope to automatically capture digitized waveforms when low margins are detected as a result of the assessment of the electrical margin of the multi-lane high speed I/O link; and providing a software plug in to configure the one or more of the user-selectable options for the DUT by configuring DUT silicon to implement the one or more of the user-selectable options. Under control of the controller 210, some of all of the above functionality may also be provided as user-selectable options for operating the margin tester 102.

In an example embodiment, the margin test may include assessing, by the margin tester 100, for each DUT of a plurality of devices under test (DUTs), timing eye width margin, in either or both Tx and Rx directions, for each high-speed input/output (I/O) lane of a multi-lane high speed I/O link of the DUT. The margin tester 100 may then detect timing eye width margin measurements for multiple DUTs of the plurality of DUTs that are each below a predetermined threshold for different lanes across the multiple DUTs. A potential DUT assembly or production issue may then be detected (visually or automatically by the margin tester 102) based on the detection of the timing eye width margin measurements for the multiple DUTs that are each below the predetermined threshold for different lanes across the multiple DUTs.

As an example, in one embodiment, the add-in card margin tester, such as add-in card margin tester 202 shown in FIG. 2, may be used for bench testing/characterization of pre-production samples of a motherboard with one PCIe x8 slot. The following example test process may be performed using the add-in card margin tester 202 with an E-6 timing eye width margin (Left+right) measured for the slot over several millisecond test on each lane simultaneously. The present example includes timing only for simplicity, but other embodiments may include other measurements. Each measurement in the present example is done 3 times. However, this may be user programmable in various embodiments. The measurements shown in the chart 902 (FIG. 9) are performed at the margin tester receivers as well as the at motherboard DUT receivers. The measurements made at the at motherboard DUT receivers and may be performed in two ways. The first way may be using margin tester jitter (Sj) and voltage swing sweeps. The second way may be using on-die margin testing at the motherboard receiver. For example, the on-die margin testing at the motherboard receiver may, under control of the controller 210 of the add-in card margin tester 202, be run through software on a bootable drive connected to motherboard DUT or basic input/output system (BIOS) software on the motherboard DUT, for supported speeds. In the present example, the measurements are done at 16 GT/s, but may vary and may be user configurable.

FIG. 9 is a chart 902 showing results of an example margin test of several DUTs performed by the high-speed I/O margin tester 102 and identification of potential DUT assembly or production issues based on the results of the margin test, according to an example embodiment. As shown in the chart 902, the consistently low margin on Lane 2 across all five DUTs, DUT #1 to DUT #5, may be an indicator of a potential design issue of the devices, since the low margin occurs on all of the DUTs. In contrast, the low margin on DUT #1 Lane 4, DUT #3 on Lane 0, and DUT #4 on Lane 6 may be indicators of potential assembly or production issues with those specific lanes on those specific DUTs, since those low margin numbers do not have a set pattern of poor margins.

Embodiments of the invention greatly expand the analysis of such test results as described with FIG. 9 to a system that can generate and store historical records of previous margin tests of particular components. Then, those historical records can be analyzed to detect patterns of failures and successes. Subsequent tests may be performed and the results added or supplemented to the ever-growing library of results. Additional, related data, such as device failure rates may be further added to the library, or in another library related to the data library. This failure rate data may be added much later than the original data, for example months or years later. Artificial analysis, machine learning, or other methods may be used to study the dataset and compare it to the failure rate data, or other data gathered about the devices. With enough training, analysis results may be used to generate predictions indicators or early signals of potential problems that may arise with devices in the future.

Figure 10:
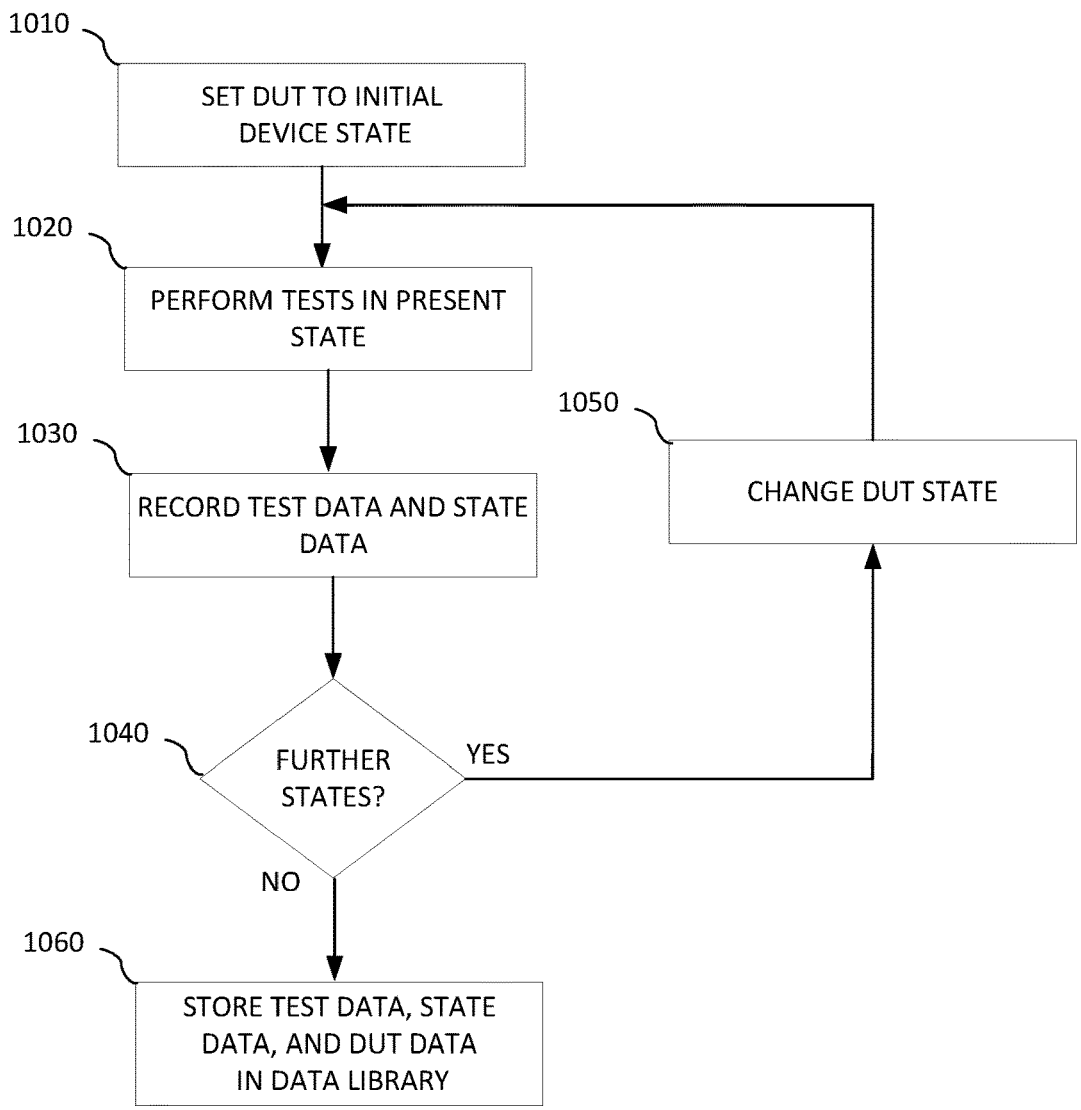
FIG. 10 is a flowchart illustrating example flow operations that may be used in a system for data creation, storage, analysis, and training according to embodiments of the invention.

FIG. 10 is a flowchart illustrating example flow operations 1000 that may be used in a system for data creation, storage, analysis, and training according to embodiments of the invention. Flow 1000 begins at an operation 1010 where a DUT is placed in an initial state of a test session. This operation 1010 or any of the operations described herein may be performed by any of the margin testers 100 described above or by another device in the testing system. As described above, in performing compliance or other tests, the DUT steps through multiple different states during a testing session. For PCIe, for example, categories of states may include Link Training states, Re-Training (recovery) state, software power management states, active-state power management states, and other states. Of course, other devices or protocols may use these same states, variations of these states, or different states as the DUT is being tested.

In operation 1020, tests are performed in the present DUT state, and the test and state data are recorded in an operation 1030. Any number of separate tests may be performed in operation 1020 depending on the test plan. The plan may call for a single test in each state or thousands (or hundreds of thousands) of tests in another state. As described above, the tests may include margin analysis, such as by injecting various amounts of noise into the test signals. Such noise may be generated through controlling voltage and/or jitter of the test signals. The test and state data recorded in operation 1030 may include the raw test data as well as summaries of the test data. It may also include eye diagrams of the tests which may be stored with the test and state data. Other data related to the tests or state, such as the time spent in each state, and the final outcome of the state, such as pass/fail or conforming may also be stored. Yet further data about the state may include the amount of time and number of tries a device may take to proceed to subsequent states, i.e., transitions, of the test.

Although described above with reference to local testing, it is possible that the data recorded in operation 1030 (and later, in operation 1060) is originally generated at an external location and sent to the central repository or library through a communication network, such as the internet. In this way, embodiments of the invention may accumulate significant amounts of data from a variety of manufacturers and others who perform tests, without the necessity of performing the tests themselves. This test data may be sent to the central repository in real-time, or may be downloaded at the conclusion of the tests. Test data may also be stored in the cloud, such as an internet-connected data storage source and retrieved periodically or on demand at a central location and stored in the library through a communication network.

Operation 1040 determines whether there are further DUT states to test in the test session. If so, an operation 1050 changes the DUT to the subsequent state in the test session, and the tests, or different tests, are performed in the new state in operation 1020 and the test and state data for the new state are recorded again in operation 1030.

If instead the final test state has been completed, an operation 1060 stores all relevant data about the test, state, and DUT of the test session in a repository or library. The DUT data may include data that the user enters about the DUT, such as a code name or identifier. The DUT data may include the class of DUT, as well as the version and perhaps even a unique identifier such as a serial or production number. Such DUT identifying data may be stored in the DUT itself, or may be entered by a user as the DUT is being tested. The margin tester may also generate DUT identifying data, such as the number of pins, lanes, link states or training states of the DUT, which may also be stored with the test data in operation 1060. Such identifying data may be used in embodiments to identify when the same DUT is tested at a later time, or if another DUT in the same class or otherwise related to the original DUT is tested in a later test. Embodiments of the invention can relate the tests of related DUTs together for enhanced analysis, as described below.

Additional data may be stored in operation 1060 such as the order in which states change, and the total amount of time spent in all states of the test. Further data such as date, time, temperature, and location of the test may also be stored in operation 1060, as well as an overall pass/fail of whether the DUT passed all of the tests. All of the data described above is stored in a massive library, which grows as each subsequent test of any DUT is performed.

Figure 11:
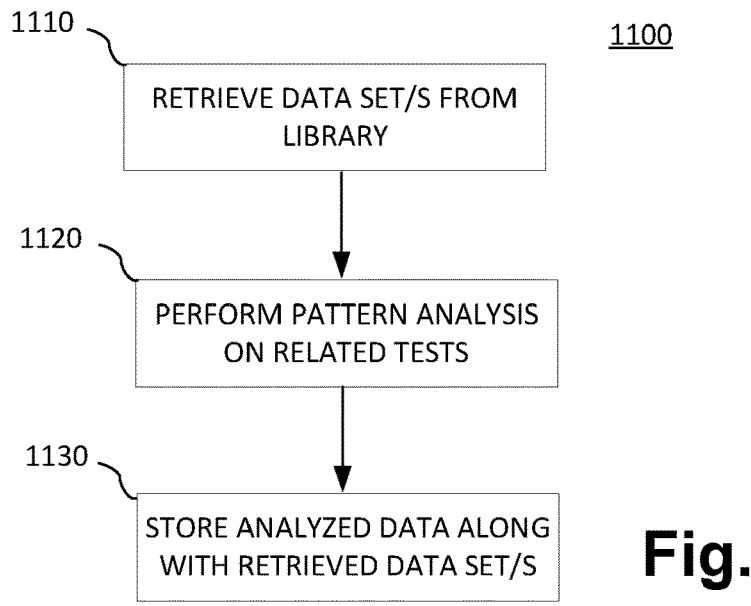
FIG. 11 is a flowchart illustrating example flow operations that may be used in a system for data creation, storage, analysis, and training according to embodiments of the invention.

FIG. 11 is a flowchart illustrating example operations that may be performed after an original set of test data is generated. In a flow 1100, an operation 1110 first retrieves one or more data sets from the data library described above. When the library is first created, the amount of data will be small or even minimal. But, as the library grows, the information stored in the library and the analysis of such information may be useful to provide predictive data, as described in detail below.

Operation 1120 performs pattern analysis or uses other types of analysis to analyze the data sets retrieved in operation 1110. Some elementary pattern analysis is illustrated above in FIG. 9, where analysis of the test data generated an indication that there may be a potential design issue of Lane 2, or a production issue on various of the DUTs 1, 3, and 4. The pattern analysis of operation 1120 is much more sophisticated than just comparing related rows and columns, and may include detailed statistical analysis of all portions of the test results, such as time in state, number of retrainings, which states yield more errors, whether voltage variation cause more errors than timing (jitter) variation, etc. Analysis may be performed on any of the data or combinations of data stored in the data record. Then, the results of the analysis may be stored back into the data library, or may be stored in a library separate from the original data library and related back to the original data library in an operation 1130. Examples of using the analysis or data or trends found in the analysis during subsequent testing or diagnostics are provided below. The results of the analysis performed in operation 1120 may result in certain recurring patterns to be observable in individual or classes of DUTs. These recurring patterns may be thought of as a scent or signature that identify common behaviors between related or even unrelated devices. For example, it may be the case that a particular manufacturer nearly always has more test margin in the transmit direction of a lane compared to the receive direction. If this recurs often enough, embodiments of the invention may determine that a particular DUT was made by the manufacturer by observing that the transmit margin exceeded the receive margin, even without knowing the DUT origin.

Figure 12:
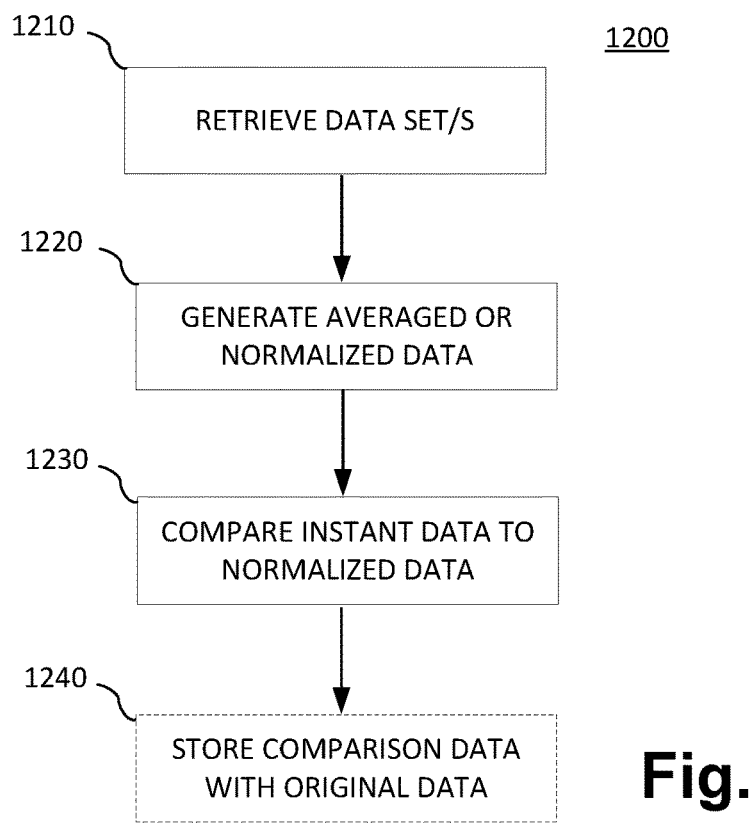
FIG. 12 is a flowchart illustrating example flow operations that may be used in a system for data creation, storage, analysis, and training according to embodiments of the invention.

FIG. 12 illustrates a flowchart describing a particular type of pattern analysis that may be used in embodiments of the invention. In this flow 1200, the data retrieved in an operation 1210 is averaged or normalized in an operation 1220. The normalization or averaging may be made on only a few number of data sets retrieved in operation 1210, or operation 1210 may retrieve large numbers of data sets, such as millions. Of course, the larger the number of data sets are averaged, the more accurate the average number becomes to being an actual average of test results across all devices. It is possible that two data sets to be averaged do not match exactly. For instance, one data set of a DUT test may have included 40 individual state transitions while another data set included 90 transitions. In such a case, embodiments of the invention may still average any of the tests that have common or the same number of transitions, or are possible to be averaged or normalized to yield desired results. In this example, the operation 1220 would average the 40 common transitions between the two tests, and not average the remaining 50 transitions of the second data set. In other words, the sets of test data do not have to match exactly to perform an averaging, normalizing, or other pattern analysis described above with reference to FIG. 11.

Then, in an operation 1230, the instant data, such as the data generated from the last DUT that was tested, may be compared against the normalized or averaged data and a comparison generated to produce a deviation data set. The comparison may be performed by a comparator, which may be a function or component of the controller 210, 310, or 410, or a comparator function defined in the FPGA 514 (FIG. 5). This deviation data set measures how different the instant data is from the normalized or average data. The deviation from the average may be important information that indicates a particular DUT or class of DUTs performed well below or well above the average DUT. Recall from above that the data sets in the library include DUT identification, including class of DUTs. Embodiments of the invention, therefore, are able to identify individual or classes of DUTs that may be outliers compared to their peers or similar devices using one or more deviation data sets. Such analysis may reveal design weaknesses.

After the comparison of operation 1230, the comparison or deviation data may optionally be stored along with the original data in the data library in an operation 1040. Operation 1040 is optional because it may not be necessary that every analyzed data set include comparison data. Or, it is possible that comparison data be generated for just a few data sets within the data storage library.

It is possible that the flow 1200 may execute automatically at the conclusion or even within (concurrently) the flow 1000 described with reference to FIG. 10. For instance, deviation data, which is generated as described above, may be generated at the conclusion of the final test in each state, and be included in the operation 1020. Then, the deviation data may be stored alongside the standard test and state data in operation 1030. Deviations beyond a statistical significance may be flagged or otherwise indicated to the user, such as in the test results.

Figure 13:
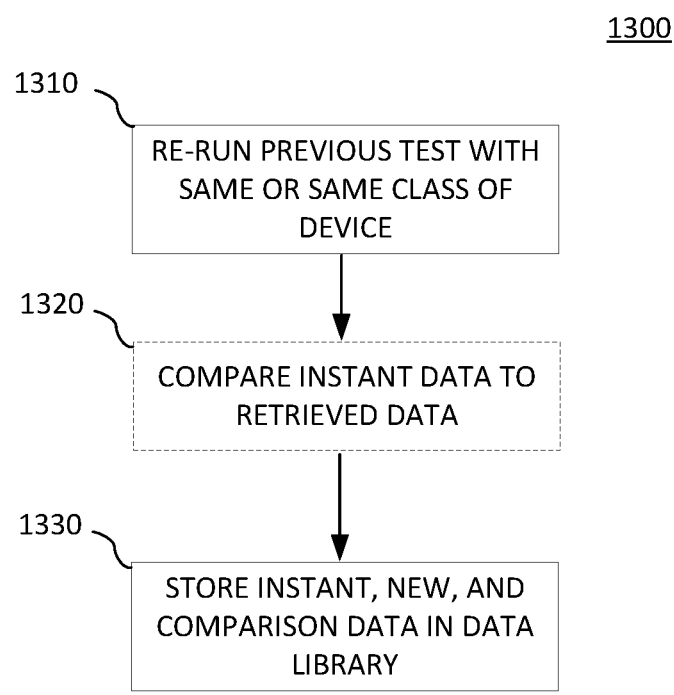
FIG. 13 is a flowchart illustrating example flow operations that may be used in a system for data creation, storage, analysis, and training according to embodiments of the invention.

FIG. 13 is a flowchart illustrating how the dataset may be used to observe performance of a DUT over time. Recall that part of the data stored in the operation 1060, or elsewhere in the flow of FIG. 10 is DUT identification data, such as type, class, manufacturer, number of lanes, unique identifier if provided, etc. In the flow 1300, a DUT is tested in an operation 1310. Then, the flow 1300 may inspect the library to see if the DUT has been tested previously. For instance a DUT or class of DUTs may be tested during development to generate a first set of test data. Then the same DUT or class of DUTs may be tested in a prototype stage, and then later in a product release stage. The same DUT may be tested months or years later after it has been in production. Each of these tests and test results may be stored and related to the earlier tests of the DUT or class of DUTs in the library, effectively creating a timeline of test results. In an operation 1320, the test results could be compared to one another to determine if the performance of the DUT changes over time, such as experiencing decreasing performance. Or perhaps performance decreases between two or three subsequent tests, each several months apart, and then maintains the same or similar performance for months afterwards.

Operation 1320 is optional, as every test of a previously tested device need not necessarily include a comparison to previous tests. Instead, the new test results may be stored in the library in an operation 1330 without such comparison.

Figure 14:
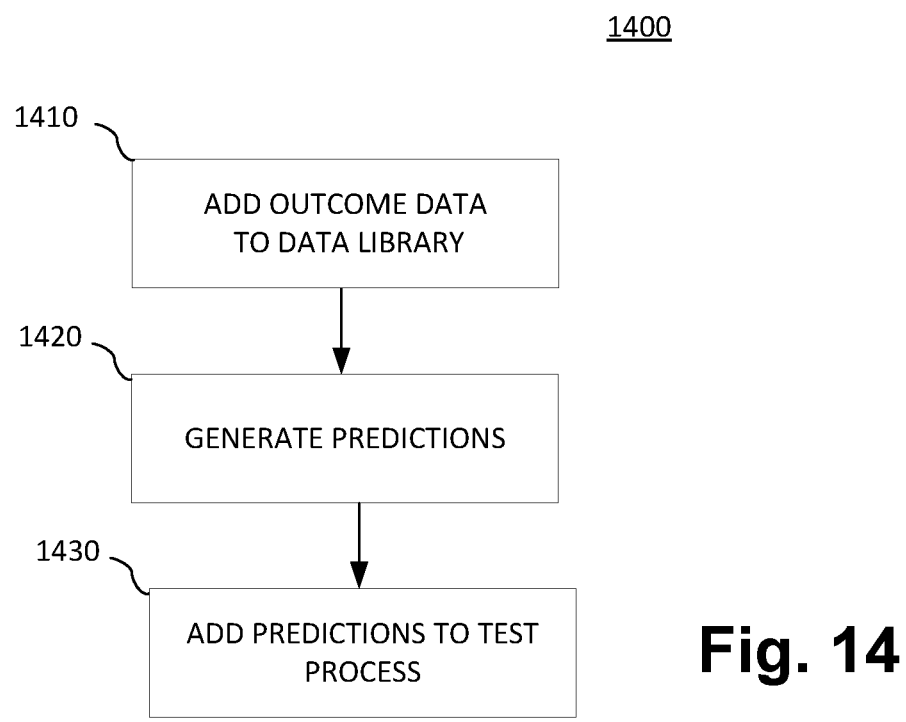
FIG. 14 is a flowchart illustrating example flow operations that may be used in a system for data creation, storage, analysis, and training according to embodiments of the invention.

FIG. 14 is a flowchart illustrating how embodiments of the invention generate predictions of future device performance, and may use those predictions as part of the DUT testing itself. Operation 1410 adds outcome or device operation data to the data library. Some outcome or operation data may be added as a natural consequence of operation 1310 (FIG. 13), where a DUT that has been tested previously is tested again. Or, such outcome data may include any data gleaned from failure or success of DUTs that had been previously tested. The outcome data in operation 1410 need not necessarily come from previous test results, but may alternatively or additionally be other data added to the library. The other data may include information about device operation, such as longevity or failures of particular devices or classes of devices. For example, assume ten DUTs failed after being in service for over 24 months. Also assume that all of the DUTs had previous test results stored in the data library. The outcome data added to the library may merely include that the devices failed, or may include a date of failure, without any accompanying test data. Analysis of the test results indicated that seven of the DUTs took longer to pass the series of tests for lane 1, which is nearest a power supply, than to pass for lane 4, which is furthest away from the power supply. So, one prediction that may be generated in operation 1420 is that any similar DUT that takes longer to pass tests for lane 1 compared to lane 4 may have a higher incidence of failure within the next 24 months compared to other DUTs. Then, in an operation 1430, the prediction may be added to the test procedure itself.

Figure 15:
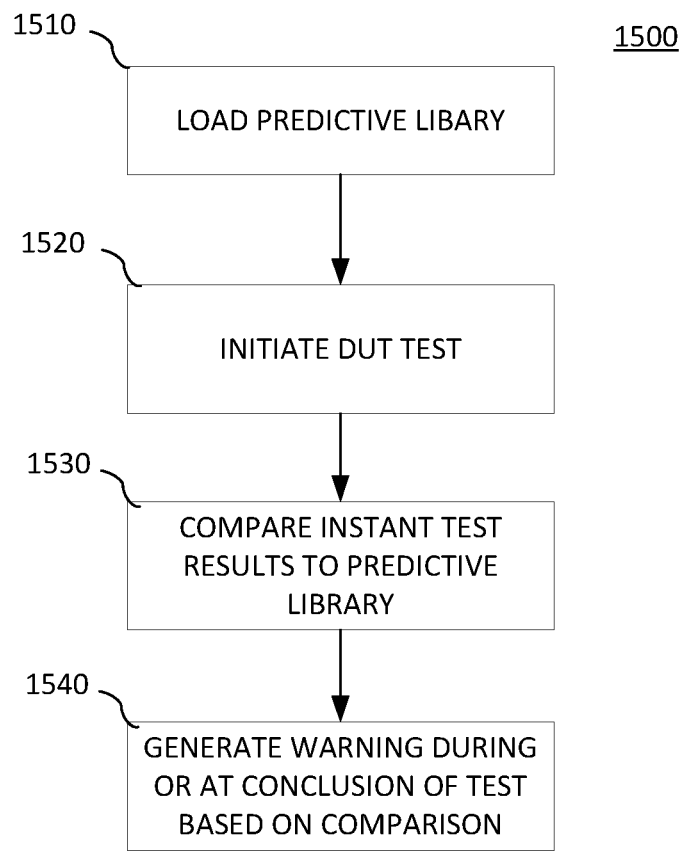
FIG. 15 is a flowchart illustrating example flow operations that may be used in a system for data creation, storage, analysis, and training according to embodiments of the invention.

FIG. 15 continues this hypothetical scenario when the test program loads a predictive library as part of the startup procedures of the test in an operation 1510. This library may include the predictions generated in operation 1420 (FIG. 14), as well as predictions made from other data analysis. Over time the prediction library may grow to include predictions from many different types of data. The prediction library also gets more accurate over time as more outcome data is added to the library that describes long-term success or failure of DUTs or classes of DUTs that have been previously tested.

The DUT test, such as that of flow 1000 (FIG. 10) is initiated in an operation 1530, and the test begins. Then, as the DUT is being tested, the test results are compared to the predictive library. Assume that the current DUT being tested also indicates that the DUT took longer to pass the tests for lane 1 compared to lane 4, thus matching one of the previously stored predictions. Then, the flow 1500 can generate a warning in an operation 1540 that the DUT being tested may include a possibility of early failure.

In other embodiments, the predictive library need not be compared against in real-time during the test of the DUT in the operation 1530, but instead could be run on stored data, i.e., data stored from a previous test session.

It may be beneficial to perform the operations of flow 1500 during a development or prototype state of device development. Then a potential design flaw may be able to be corrected in development. In the example described above, perhaps the designer finds that moving lane 1 further from the power supply yields test results where lanes 1-4 generate similar test data. In this way the predictive test may be an effective design tool.

Using embodiments of the invention as described above allows designers to track deviations from normal transitions that could be indicative of design failures. Potential design changes could be vetted against performance data already stored in the library from prior DUT tests. Using embodiments of the invention may help determine root causes of failures by indicating device state, number of required retrainings, or other information about the DUT as it passes through the state transitions.

Aspects of the disclosure may operate on a particularly created hardware, on firmware, digital signal processors, or on a specially programmed general purpose computer including a processor operating according to programmed instructions. The terms controller or processor as used herein are intended to include one or more microprocessors, microcomputers, Application Specific Integrated Circuits (ASICs), and dedicated hardware controllers working independently or in conjunction with each other. One or more aspects of the disclosure may be embodied in computer-usable data and computer-executable instructions, such as in one or more program modules, executed by one or more computers (including monitoring modules and controllers), or other devices. Generally, program modules include routines, programs, objects, components, data structures, etc. that perform particular tasks or implement particular abstract data types when executed by a processor in a computer or other device. The computer executable instructions may be stored on a non-transitory computer readable storage medium such as a hard disk, optical disk, removable storage media, solid state memory, DDR memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 is a test device including at least one test interface structured to connect to a device under test (DUT), one or more controllers structured to generate margin test signals for testing the DUT during one or more testing states of a test session, a data repository structured to store results of the testing of the DUT during the one or more testing states of the test session along with a DUT identifier of the DUT tested during the test session, the one or more controllers further structured to determine whether any results of the DUT test results match a predictive outcome that is based from an analysis of previous DUT tests, and a user interface operatively coupled to the test device and structured to display an indication that the tested DUT matched the predictive outcome.

Example 2 is a test device according to Example 1 in which the data repository is structured to store a DUT identifier; a DUT class; time spent in each of the one or more testing states; a passing state of each of the one or more testing states; or a number of re-trainings for each of the one or more testing states.

Example 3 is a test device according to any of the above Examples, in which the data repository is further structured to store an eye diagram illustrating testing results of multiple tests within one of the one or more testing states.

Example 4 is a test device according to any of the above Examples, in which the test device is structured to read the DUT identifier from a storage location on the DUT itself or in which the test device is structured to generate the DUT identifier.

Example 5 is a test device according to any of the above Examples, in which the predictive outcome is generated from an analysis of previous DUT tests as well as data about an operational lifetime of one or more DUTs.

Example 6 is a test device according to any of the above Examples, in which the data repository receives results of the testing of the DUT through a communication network.

Example 7 is a test device according to any of the above Examples, in which the one or more testing states of the test session include one or more power states, one or more transmission states, or one or more link states.

Example 8 is a method of operating a test device, comprising establishing a connection to a device under test (DUT), generating test signals for margin testing the DUT during one or more testing states of a test session, storing results of the testing of the DUT during the one or more testing states of the test session in a library along with a DUT identifier of the DUT tested during the test session, determining whether any results of the DUT test results match a predictive outcome that is based from an analysis of previous DUT tests, and, when any results of the DUT test results match the predictive outcome, producing an indication to a user of the test device.

Example 9 is the method of claim 8 in which the library is structured to store a DUT identifier; a DUT class; time spent in each of the one or more testing states; a passing state of each of the one or more testing states; or a number of re-trainings for each of the one or more testing states.

Example 10 is the method of claim 8 in which the library is further structured to store an eye diagram illustrating testing results of multiple tests within one of the one or more testing states.

Example 11 is the method of any of the preceding example methods further comprising reading the DUT identifier from a storage location on the DUT itself or generating the DUT identifier.

Example 12 is the method of any of the preceding example methods in which the predictive outcome is generated from an analysis of previous DUT tests as well as data about an operational lifetime of one or more DUTs.

Example 13 is the method of any of the preceding example methods in which storing results of the testing of the DUT comprises sending the results through a communication network.

Example 14 is the method of any of the preceding example methods in which the one or more testing states of the test session include one or more power states, one or more transmission states, or one or more link states.

Example 15 is a method of generating and using predictive outcomes, including receiving data representing operation information about one or more DUTs, determining commonalities in test results of the one or more DUTs generated during previous margin testing to match past test results to the operating information, creating a list of the past test results that are matched to the operating information, testing a DUT related to the one or more DUTs during one or more testing states of a test session to generate present test results, comparing the present test results to the list of past test results, and generating an indication when present test results match any of the past test results on the list of past test results.

Example 16 is the method of Example 15, in which the past test results include one or more eye diagrams.

Example 17 is the method of Example 15, in which determining commonalities in test results of the one or more DUTs generated during previous margin testing to match past test results to the operating information further comprises comparing one set of past test results of the one or more DUTs to another set of past test results of the one or more DUTs.

Example 18 is the method of Example 15, in which the operation information comprises longevity or failure information about the one or more DUTs.

Example 19 is the method of Example 15, in which the test results generated during the previous margin testing include results generated during one or more power states, one or more transmission states, or one or more link states.

Example 20 is the method of Example 15, further comprising storing the list of the past test results that are matched to the operating information on a margin testing device.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

We claim:

1. A test device, comprising:
    at least one test interface structured to connect to a device under test (DUT);
    one or more controllers structured to generate margin test signals for testing the DUT during one or more testing states of a test session;
    a data repository structured to store results of the testing of the DUT during the one or more testing states of the test session along with a DUT identifier of the DUT tested during the test session;
    the one or more controllers further structured to determine whether any results of the testing of the DUT match a predictive outcome, wherein the predictive outcome is generated from an analysis of results of previous testing of the DUT and one or more other DUTs as well as data about an operational lifetime of the one or more other DUTs; and
    a user interface operatively coupled to the test device and structured to display an indication that the results of the testing of the DUT matched the predictive outcome, wherein the indication includes a predicted operational life of the DUT.

2. The test device of claim 1 in which the data repository is structured to store the DUT identifier along with at least one of: a DUT class; time spent in each of the one or more testing states; a passing state of each of the one or more testing states; or a number of re-trainings for each of the one or more testing states.

3. The test device of claim 2 in which the data repository is further structured to store an eye diagram illustrating results of multiple testing of the DUT within one of the one or more testing states.

4. The test device of claim 2 in which the test device is structured to read the DUT identifier from a storage location on the DUT itself or in which the test device is structured to generate the DUT identifier.

5. The test device of claim 1 in which the data repository receives results of the testing of the DUT through a communication network.

6. The test device of claim 1 in which the one or more testing states of the test session include one or more power states, one or more transmission states, or one or more link states.

7. A method of operating a test device, comprising:
establishing a connection to a device under test (DUT);
generating test signals for margin testing the DUT during one or more testing states of a test session, wherein the test signals are communicated with the DUT via the connection;
storing results of the testing of the DUT during the one or more testing states of the test session in a library along with a DUT identifier of the DUT tested during the test session;
determining whether any results of the testing of the DUT match a predictive outcome, wherein the predictive outcome is generated from an analysis of results of previous testing of the DUT and one or more other DUTs as well as data about an operational lifetime of the one or more other DUTs; and
when any results of the testing of the DUT match the predictive outcome, producing an indication of the match to a user of the test device, wherein the indication includes a predicted longevity of the DUT.

8. The method of claim 7 in which the library is structured to store the DUT identifier along with at least one of a DUT class; time spent in each of the one or more testing states; a passing state of each of the one or more testing states; or a number of re-trainings for each of the one or more testing states.

9. The method of claim 8 in which the library is further structured to store an eye diagram illustrating results of multiple testing of the DUT within one of the one or more testing states.

10. The method of claim 8, further comprising reading the DUT identifier from a storage location on the DUT itself or generating the DUT identifier.

11. The method of claim 7 in which storing results of the testing of the DUT comprises sending the results through a communication network to the library.

12. The method of claim 7 in which the one or more testing states of the test session include one or more power states, one or more transmission states, or one or more link states.

13. A method of generating and using predictive outcomes, comprising:
receiving data representing operating information about one or more DUTs;
determining commonalities in test results of the one or more DUTs generated during previous margin testing to match past test results to the operating information;
creating a list of the past test results that are matched to the operating information;
testing a DUT related to the one or more DUTs during one or more testing states of a test session to generate present test results;
comparing the present test results to the list of past test results; and
generating an indication when the present test results match any of the past test results on the list of past test results, wherein the indication includes a predicted incidence of failure of the DUT.

14. The method of claim 13 in which the past test results include one or more eye diagrams.

15. The method of claim 13 in which determining commonalities in test results of the one or more DUTs generated during previous margin testing to match past test results to the operating information further comprises comparing one set of past test results of the one or more DUTs to another set of past test results of the one or more DUTs.

16. The method of claim 13 in which the operating information comprises longevity or failure information about the one or more DUTs.

17. The method of claim 13 in which the test results of the one or more DUTs generated during the previous margin testing include results generated during one or more power states, one or more transmission states, or one or more link states.

18. The method of claim 13, further comprising storing the list of the past test results that are matched to the operating information on a margin testing device.

* * * * *